(12) United States Patent
Boris et al.

(10) Patent No.: US 8,752,951 B2
(45) Date of Patent: *Jun. 17, 2014

(54) INKJET INK COMPRISING DYNAMIC SURFACE TENSION AGENT

(75) Inventors: David Charles Boris, Webster, NY (US); Teresa Joy Hosmer, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/435,675

(22) Filed: Mar. 30, 2012

(65) Prior Publication Data

US 2013/0258012 A1    Oct. 3, 2013

(51) Int. Cl.
*B41J 2/01*    (2006.01)
(52) U.S. Cl.
USPC .......................................... 347/100
(58) Field of Classification Search
USPC .......................................... 347/100
See application file for complete search history.

(56) References Cited

U.S. PATENT DOCUMENTS

| | | | |
|---|---|---|---|
| 6,436,180 B1 | 8/2002 | Ma et al. | |
| 7,478,902 B2 | 1/2009 | Prasad et al. | |
| 7,622,513 B2 | 11/2009 | Sarkisian et al. | |
| 7,696,262 B2 | 4/2010 | Cagle et al. | |
| 7,699,457 B2 | 4/2010 | Namba et al. | |
| 7,789,955 B1 | 9/2010 | Gamblin et al. | |
| 7,862,653 B2 | 1/2011 | Sanada et al. | |
| 7,878,643 B2 | 2/2011 | Kudo et al. | |
| 7,892,340 B2 | 2/2011 | Namba et al. | |
| 2006/0116439 A1 | 6/2006 | Sarkisian et al. | |
| 2007/0120928 A1 | 5/2007 | Ma et al. | |
| 2008/0049086 A1 | 2/2008 | Rolly | |
| 2008/0118657 A1* | 5/2008 | Taverizatshy et al. | 427/466 |
| 2008/0207805 A1 | 8/2008 | Blease et al. | |
| 2010/0245416 A1 | 9/2010 | Ohshima et al. | |
| 2010/0292372 A1 | 11/2010 | Gardner et al. | |
| 2010/0295891 A1 | 11/2010 | Goto et al. | |
| 2011/0092610 A1 | 4/2011 | Habashi et al. | |
| 2013/0258011 A1* | 10/2013 | Boris et al. | 347/100 |

FOREIGN PATENT DOCUMENTS

EP    1 138 729 B1    1/2005
EP    1 412 438       5/2008

* cited by examiner

*Primary Examiner* — Laura Martin
(74) *Attorney, Agent, or Firm* — Andrew J. Anderson; Raymond L. Owens

(57) ABSTRACT

An inkjet ink comprising water, colorant, and a dynamic surface active agent at an effective concentration such that dynamic surface tension $DST_{20\ min}$ at 20 minutes universal surface age is less than each of dynamic surface tension $DST_{1\ sec}$ at 1 second universal surface age and dynamic surface tension $DST_{10\ sec}$ at 10 seconds universal surface age, and the difference between $DST_{10\ sec}$ and $DST_{20\ min}$ is greater than 9.2 mN/m at 21° C. or the difference between $DST_{1\ sec}$ and $DST_{20\ min}$ is greater than 15.5 mN/m at 21° C., and static surface tension of the ink is less than 50 mN/m. Large dynamic surface tension differences between the indicated time scales yield an optical density improvement in printed images. Anionic fluorosurfactant comprising a phosphate group at concentrations up to about 1 weight percent enables a combination of high optical density and good felt wetting in inkjet cartridges.

23 Claims, 3 Drawing Sheets

○ KRUSS INSTRUMENT MBP SURFACE AGE
□ MBP AT 21C VS AVERAGE UNIVERSAL SURFACE AGE
△ HANGING DROP INSTRUMENT RUN TIME
◇ HANGING DROP AT UNIVERSAL SURFACE AGE

INKJET INK COMPRISING DYNAMIC SURFACE TENSION AGENT

CROSS REFERENCE TO RELATED APPLICATIONS

Reference is made to commonly assigned U.S. Ser. No. 13/435,617 filed Mar. 30, 2012, herewith, directed towards "Inkjet Ink Comprising Dynamic Surface Tension Agent," the disclosure of which is incorporated by reference herein in its entirety.

FIELD OF THE INVENTION

The invention relates generally to the field of inkjet printing fluids, and in particular to inkjet inks comprising a dynamic surface tension agent. More specifically, the invention relates to specially formulated inks which result in improved optical density for printed images.

BACKGROUND OF THE INVENTION

Ink jet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand ink jet, individual ink droplets are projected as needed onto the image-recording element to form the desired printed image. Common methods of controlling the projection of ink droplets in drop-on-demand printing include piezoelectric transducers and thermal bubble formation. In another process, known as continuous ink jet, a continuous stream of droplets is formed and individual droplets are differentially deflected from the stream in an image-wise manner onto the surface of the image-recording element, while un-imaged droplets are caught and returned to an ink sump. Ink jet printers have found broad applications across markets ranging from desktop document and photographic-quality imaging, to short run printing and industrial labeling.

The ink compositions known in the art of inkjet printing may be aqueous- or solvent-based, and in a liquid, solid or gel state at room temperature and pressure. Aqueous-based ink compositions are preferred because they are more environmentally friendly as compared to solvent-based inks, and most printheads are designed for use with aqueous-based inks.

The ink composition may be colored with pigments, dyes, polymeric dyes, loaded-dye/latex particles, or any other types of colorants, or combinations thereof. Pigment-based ink compositions are advantageous because such inks render printed images giving comparable optical densities with better resistance to light and ozone image degradation as compared to printed images made from other types of colorants. The colorant in the ink composition may be yellow, magenta, cyan, black, gray, red, violet, blue, green, orange, brown, etc. These inks may further contain polymeric binders.

Although numerous ink compositions are known in the art of inkjet printing, several key challenges remain. One challenge is to obtain the highest possible image quality on a variety of inkjet receivers. It is desirable to obtain the highest optical density for a given amount of ink applied to an inkjet receiver, especially on plain papers.

In addition to the necessity for an ink to have a good optical density when printed on plain paper, there are a number of constraints on the physical properties of an inkjet ink so that it can function effectively in an inkjet printer and make a lasting image. These properties include viscosity and rheology, ink physical stability, redispersibility of dried ink for circulating systems, surface tension and wetting, and jetting performance including drop formation stability, satellite suppression, print window, latency, and repeated firability. It is also important that inks dry fast on the paper, do not repel one another, and absorb into the substrate without bleeding when over printed with different colors. The dried inks need to have good image permanence including fade and scratch resistance.

A further challenge for inks comprising both pigments and polymeric binders is managing their ability to function in the printer system. Ink must properly wet the felt employed in an inkjet cartridge to regulate pressure in a printhead so that flow of ink from the cartridge and through the printhead occurs only when desired. Management of the surface tension of inks is also required to enable delivery of ink through a printhead in addition to aiding wetting of the surface of the substrate to which the ink is applied. Inkjet printheads and ink cartridges employ wicking materials to prevent leakage of ink through the printhead nozzles when not in use. The ink must have sufficient affinity for the wicking material (felt) to allow the ink to be drawn into the delivery system from the ink tank.

U.S. Pat. No. 7,878,643 discloses dye-based ink formulations with preferable ranges for dynamic surface tension at 50 ms and at 500 ms thetimes, as determined by maximum bubble pressure method (referred to herein as MBP nominal surface age, or MBP age), with a difference between these dynamic surface tensions of 7 mN/m or more.

U.S. Pat. No. 7,862,653 teaches that it is desirable to have the dynamic surface tension of the ink to be at least 49 mN/m or more at a lifetime of 50 milliseconds as determined by MBP method for improved optical density. The patent further discloses that this ink preferably have a difference between the dynamic surface tension at a lifetime of 50 milliseconds (MBP method) and the dynamic surface tension at a lifetime of 5,000 milliseconds (MBP method) of 15 mN/m or more to obtain improvements in both optical density and fixing ability. The dynamic surface tension difference in this patent is accomplished through the use of polyoxyethylene alkyl ether surfactants. Surface tensions at these short times, however, may not dictate the optical density performance, and thus may be an insufficient criterion to select the best inks.

Controlling surface tension using fluorinated surfactants has been employed in various ink formulations in the art, frequently in combination with the use of other classes of surfactants where either or both surfactants are at relatively high concentrations in the inks, such as in U.S. Patent Application 2007/0120928. In some cases, the fluorinated surfactants are disclosed in formulations without other surfactants, such as in the following publications: U.S. Patent Application 2008/0049086, U.S. Patent Application 2006/0116439, U.S. Pat. No. 7,478,902, U.S. Pat. No. 7,622,513, and U.S. Pat. No. 7,696,262. These publications, however, typically disclose the use of fluorosurfactants at relatively high levels (typically greater than 0.1 wt %), in combination with surface active co-solvents such as 1,2-hexanediol.

Generally the use of very low concentration surfactants yields high static surface tension inks which have been deemed undesirable for ink formulation and ignored in the art because of the practical challenges in delivering the ink from the ink cartridge to the ink printhead. Typically "felt" wicking materials will not allow a smooth stream of ink to transfer to the printhead if the surface tension of the ink is not sufficiently low. High surface tension inks are also slow to penetrate the paper which will yield improved optical density if allowed to dry unperturbed, but are typically prone to smear and thus impractical.

Problem to be Solved by the Invention

Maintaining a high dynamic surface tension of an ink at short time scales (milliseconds) yields a poorer wettability (higher contact angle) on substrates and can delay absorption into the surface until the dynamic surface tension falls. This wetting delay is one mechanism for improved density. However, we find that this criterion of high dynamic surface tension at very short times (e.g., 50 milliseconds) alone is insufficient to predict optical density. The present invention provides useful criteria to select the best inks for improved optical density on plain papers.

SUMMARY OF THE INVENTION

In one embodiment, the invention is directed towards an inkjet ink comprising water, colorant, and a dynamic surface active agent at an effective concentration such that the ink has a dynamic surface tension $DST_{1\ sec}$ at 1 second universal surface age, a dynamic surface tension $DST_{10\ sec}$ at 10 seconds universal surface age and a dynamic surface tension $DST_{20\ min}$ at 20 minutes universal surface age, where $DST_{20\ min}$ is less than each of $DST_{1\ sec}$ and $DST_{10\ sec}$, and the difference between $DST_{10\ sec}$ and $DST_{20\ min}$ is greater than 9.2 mN/m at 21° C. or the difference between $DST_{1\ sec}$ and $DST_{20\ min}$ is greater than 15.5 mN/m at 21° C., and wherein the static surface tension of the ink is less than 50 mN/m. Large dynamic surface tension differences between the indicated time scales yield an optical density improvement in printed images. Where the dynamic surface tension agent is an anionic fluorosurfactant comprising a phosphate group, concentrations up to about 1 weight percent may be employed to facilitate obtaining a combination of high optical density and good felt wetting in inkjet cartridges. Dynamic surface tensions may be measured by the hanging drop method following our detailed description which includes experimentally measuring the ink's density, correcting the measured run time to determine the universal surface age, and measuring and correcting for evaporative effects at a constant temperature of 21° C.

It appears critical to maintain a large dynamic surface tension difference between the free surface of the applied ink and the wetting front inside the paper. We believe that this surface tension difference increases the Laplace pressure and the capillary dewatering of the ink. We found the surprising result that the relevant time scales for dynamic surface tension to yield optical density improvement is much longer than was previously understood (seconds to minutes rather than milliseconds).

DETAILED DESCRIPTION OF THE INVENTION

Figure 1:
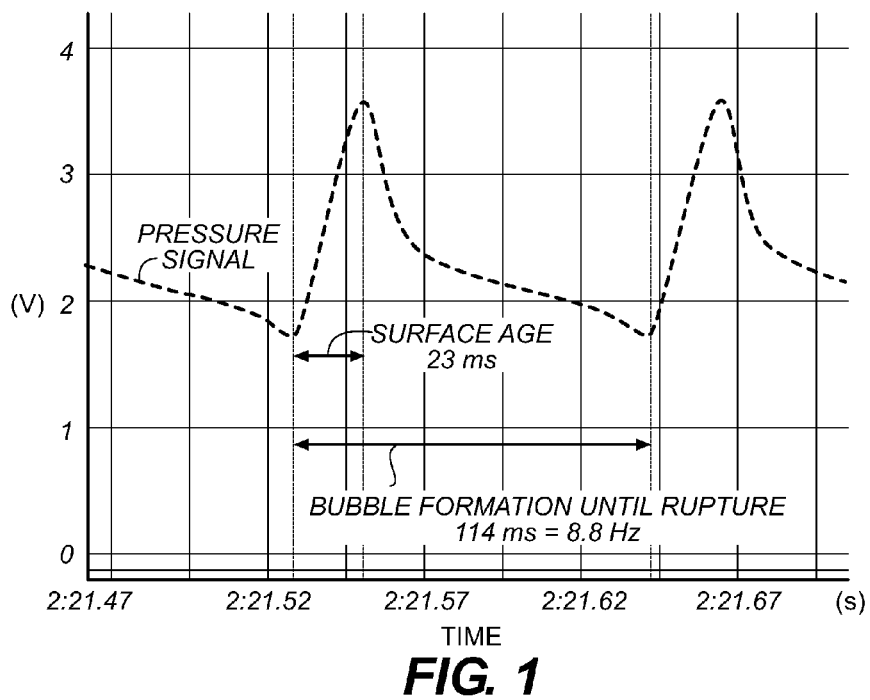
FIG. 1 is a graph of bubble pressure signal vs time for an aqueous solution at 8.8 Hz showing 23 ms Maximum Bubble Pressure nominal surface age (reproduced from Kruss manual)

The inkjet ink of the invention comprises water, colorant, and a dynamic surface tension agent at an effective concentration such that the ink has a dynamic surface tension $DST_{1\ sec}$ at 1 second universal surface age, a dynamic surface tension $DST_{10\ sec}$ at 10 seconds universal surface age and a dynamic surface tension $DST_{20\ min}$ at 20 minutes universal surface age, where $DST_{20\ min}$ is less than each of $DST_{1\ sec}$ and $DST_{10\ sec}$, and the difference between $DST_{10\ sec}$ and $DST_{20\ min}$ is greater than 9.2 mN/m at 21° C. or the difference between $DST_{1\ sec}$ and $DST_{20\ min}$ is greater than 15.5 mN/m at 21° C., and wherein the static surface tension of the ink is less than 50 mN/m. In some embodiments, the difference between $DST_{10\ sec}$ and $DST_{20\ min}$ is preferably greater than 11 mN/m, more preferably greater than 14 mN/m. In some embodiments of the invention, it may further be preferred to adjust the dynamic surface tension measured at 10 seconds universal surface age to be greater than 35 mN/m, more preferably greater than about 50 mN/m.

In some embodiments of the invention, it may be further preferred to limit the static surface tension for other purposes such as reducing ink on ink bleed or reducing ink smear. In such instances, it is preferable that the static surface tension be greater than about 15 mN/m and less than about 45 mN/m.

According to the present invention, the dynamic surface tension of the ink of the invention can be measured according to the following Hanging Drop method. The measurement of dynamic surface between 10 s and 20 minutes universal surface age is made using a hanging drop tensiometer such as the FTA-200#2. In this tensiometer one suspends a hanging drop of fluid from a 1.270 mm outer diameter needle and a video of the drop shape is recorded for more than 20 minutes. The balance between gravity and surface tension determines the resultant curvature of the drop. The density is measured experimentally using an Anton-Paar DMA 5000 which is then used to calculate the surface tension as a function of time from the stored images. The density of the inks was found to be insensitive to changes in surfactant concentration, so measuring the density of any one of the inks which only differ in surfactant concentration is sufficient. The calculation of the surface tension uses the Laplace equation and is implemented in the software of the instrument. The surface tension, drop volume and drop area are reported as a function of the image frame number and the Hanging Drop "run" time which is the time elapsed since the video started taking images. In order to accurately calculate the universal surface age of the drop, the video is triggered to begin taking images every second for 30 seconds before the solution is ejected from the needle. Thus the growth of the drop is captured as a function of time while the drop is formed. Once the drop is formed the operator starts the measurement sequence and we collect 100 more video images space logarithmically over the next 25 minutes.

We implement a simple calculation in an excel spreadsheet to calculate the correction to find the universal surface age of the drop from the Hanging Drop Run Time. The universal surface age <t> is simply the average surface age found from Equation 1:

recorded (t), since the new surface that is created as the hanging drop grows is always at a younger surface age than the total elapsed time (t). In fact, a simple way to understand the term subtracted from t in Equation 2 is that at each time step we are subtracting off the surface area*time that the newly created surface would have existed if it had been created at the start of the experiment. In Table 1 we show a sample calculation spreadsheet for finding the average universal surface age for Inventive Ink #11.

TABLE 1

Sample Calculation Spreadsheet of Surface Age from Hanging drop instrument data (Run Time, Drop Area) for Inventive Ink #11 with 0.025% ZONYL FSO.

| Run Time (s) tn | Frame (#) | DST (mN/m) | Drop Vol (ul) V(t) | Drop Area (mm^2) SA(t) | charge area (sqmm) d(SA(i)) | loss in surface area * age (mm^2 * s) d(SA(i)) * t(i) | total area * Surface Age loss (mm^2 * s) sum [d(SA(i)) * t(i))] | Surface Age (s) tn − (sum [d(SA(i)) * t(i)]/SA(t)) |
|---|---|---|---|---|---|---|---|---|
| 0.000 | 0 | 0.00 | 0.000 | 0.000 | 0.000 | 0.000 | 0.000 | 0.000 |
| 0.008 | 1 | 29.39 | 1.908 | 6.346 | 6.346 | 0.000 | 0.000 | 0.008 |
| 1.008 | 2 | 39.36 | 2.889 | 8.639 | 2.293 | 0.019 | 0.019 | 1.006 |
| 2.008 | 3 | 42.73 | 3.712 | 10.396 | 1.757 | 1.771 | 1.790 | 1.836 |
| 3.008 | 4 | 47.33 | 4.694 | 12.347 | 1.951 | 3.918 | 5.709 | 2.546 |
| 4.008 | 5 | 49.13 | 5.603 | 14.056 | 1.709 | 5.141 | 10.850 | 3.236 |
| 5.008 | 6 | 50.69 | 6.702 | 16.073 | 2.017 | 5.085 | 18.934 | 3.830 |
| 6.008 | 7 | 51.28 | 7.537 | 17.486 | 1.413 | 7.077 | 26.011 | 4.521 |
| 7.008 | 8 | 52.24 | 8.368 | 18.818 | 1.332 | 8.003 | 34.014 | 5.201 |
| 8.008 | 9 | 51.98 | 9.354 | 20.415 | 1.597 | 11.192 | 45.206 | 5.794 |
| 9.008 | 10 | 52.33 | 10.300 | 21.894 | 1.479 | 11.844 | 57.051 | 6.403 |
| 10.008 | 11 | 52.44 | 10.690 | 22.521 | 0.627 | 5.648 | 62.699 | 7.224 |
| 11.008 | 12 | 51.05 | 10.690 | 22.546 | 0.025 | 0.250 | 62.949 | 8.216 |
| 12.008 | 13 | 50.37 | 10.680 | 22.530 | | 0.000 | 62.949 | 9.214 |
| 12.208 | 14 | 50.64 | 10.690 | 22.555 | | 0.000 | 62.949 | 9.417 |
| 12.425 | 15 | 48.95 | 10.680 | 22.568 | | 0.000 | 62.949 | 9.636 |
| 12.650 | 16 | 50.08 | 10.690 | 22.571 | | 0.000 | 62.949 | 9.861 |
| 12.892 | 17 | 49.89 | 10.680 | 22.537 | | 0.000 | 62.949 | 10.101 |
| 13.142 | 18 | 49.67 | 10.680 | 22.557 | | 0.000 | 62.949 | 10.351 |

$$\langle t \rangle = \frac{\sum_{i=1}^{n}(t-t(i))\Delta SA(i)}{\sum_{i=1}^{n}\Delta SA(i)} \quad \text{Equation 1}$$

In this expression $\Delta SA(i)$ is the change in surface area created during the ith video frame at time t(i). At time t, the age of the region of surface that was created at time t(i) is simply the difference in time $(t-t(i))$ between the current time t and the time when the region of area was created t(i). The sums in Equation 1 are carried from the start of the experiment (i=1 is the first video frame where the drop area begins to increase corresponding to t=0) up to the current experimental run time (nth video frame at t(n)=t). Since the current time t is independent of i we can pull it out of the sum in Equation 1 and rewrite the equation in a form more convenient to implement in a spreadsheet:

$$\langle t \rangle = t - \frac{\sum_{i=1}^{n} t(i)\Delta SA(i)}{\sum_{i=1}^{n}\Delta SA(i)} \quad \text{Equation 2}$$

This equation makes it very clear that the average universal surface age <t> is always less than the flanging Drop run time After the drop stops growing (frame 13) the surface age correction does not change. In this example the universal surface age correction was −2.791 seconds. So the true average universal surface age is 2.791 seconds younger than the Run time reported by the Hanging Drop instrument. In Table 1 the dynamic surface tension (DST) at a universal surface age at 10 s was ~50.01 mN/m. For comparison, the DST at a Hanging Drop Run time of 10 s was 52.44 mN/m. Clearly correcting to the true average universal surface age is fairly important at short surface ages (like 10 seconds). It is significantly relatively less important, however, at very long surface ages (like 20 minutes). We have used this method to correct all of the Hanging Drop DST data reported to the average universal surface age.

Note also that the hanging drop must grow to sufficient volume for the Laplace calculation which balances surface tension and gravity to yield accurate dynamic surface tension values. Since the DST should monotonically decrease with time it is clear that the DST data in Table 1 for times less than 7.224 s universal surface age is not yet accurate due to insufficient size drops.

Optimally the drop is held in a contained environment in the presence of a quantity of the ink solution yielding a saturated atmosphere of the solvent at matched osmolality to the drop. This minimizes changes in drop concentration with time. This method allows us to measure the dynamic surface tension at very long times with excellent accuracy. In some instances to speed the measurements a comparable ink was used to saturate the chamber (or a combination of previous inks). In other cases the water control solution that was used to clean between inks was left in the chamber. This tends to inhibit evaporation completely and can lead to a slight gain in drop volume with time (typically less than ~3%) as water diffuses through the vapor phase and dilutes the higher osmolality ink. In still other instances the ink was run without a saturated atmosphere at all and there was gradual evaporation. Even in these cases, there was at most ~10% increase in concentration after 20 minutes due to evaporation. Fortunately the extent of evaporation with time is known and is quantified because the change in drop size is measured directly from the images and tabulated by the instrument software. If an ink (or surfactant) concentration series is measured, the impact of evaporation can be quantified and corrected. From our experimental concentration series we were able to determine concentration correction coefficients for each surfactant to correct for evaporation effects at long times as shown in Table 2. For our surfactants a 1% change in concentration yielded from 0.056-0.094 mN/m change in dynamic surface tension. Thus even for the most sensitive of our surfactants under extreme evaporation conditions where say ~10% evaporative loss was observed it would only result in 0.94 mN/m reduction in surface tension due to evaporation. We applied the appropriate experimentally determined evaporative correction to our experimental data before fitting and calculating metrics.

TABLE 2

Average surface tension concentration correction coefficients (mN/m per 1 wt %).

| | Zonyl FSP | Zonyl FSO | Zonyl FS-500 | Tergitol 15-s-12 | Strodex PK-90 | Surfynol 465 |
|---|---|---|---|---|---|---|
| Change in DST per 1 wt % gain | −0.094 | −0.085 | −0.077 | −0.056 | −0.065 | −0.056 |

It is somewhat challenging to control temperature in the Hanging Drop apparatus because of the small drop volume and relatively large thermal mass of the surrounding vessel. Rather than warming the ink and speeding evaporation, we elected to allow the ink to equilibrate with the vessel at room temperature (21° C.) prior to starting the experiment to minimize temperature variation throughout the experiment.

The Kruss BP2 MKII Processor controlled Bubble Pressure Tensiometer was used to determine the dynamic surface tension at short dynamic surface ages (from milliseconds to seconds). The instrument uses the maximum bubble pressure method to measure the pressure change as a bubble is generated through a capillary of known diameter and pushed into the test ink. The maximum pressure found as a function of time during bubble generation corresponds to the time when the bubble is hemispherical and has the minimum radius of curvature. Given the known geometry of the capillary one can calculate the dynamic surface tension of the fluid from the Laplace equation. The frequency of bubble generation is varied allowing one to find the dynamic surface tension as a function of time. The pressure trace shown in FIG. 1.1 of the Kruss manual, reproduced as FIG. 1, illustrates that the maximum bubble pressure (MBP) surface age is simply the empirical difference in time between the minimum bubble pressure and the maximum bubble pressure (in the case of FIG. 1.1 of the Kruss manual, 23 ms for a bubble frequency of 8.8 Hz) during bubble formation and does not reflect a true average surface age.

Figure 2:
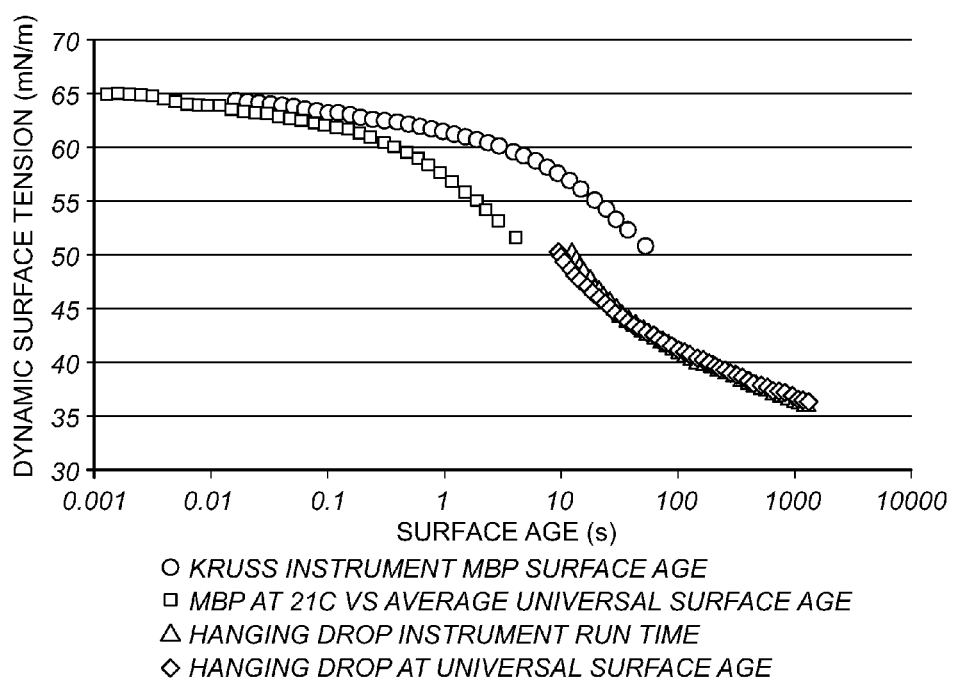
FIG. 2 is a graph of dynamic surface tension data for Inventive Ink #11 with 0.025% ZONYL FSO from Maximum Bubble Pressure and Hanging Drop tensiometers corrected to universal surface age.

Christov et al [*Langmuir* 2006, 22, 7528-754] showed that the MBP age was larger than the average universal surface age by a constant factor. For their apparatus the MBP age was found to be 36.8 times longer than the average universal surface age. The exact value of the constant shift is dependent on the specific apparatus geometry. As can be seen from the pressure trace in FIG. 1 the pressure is well approximated by a linear fit between the minimum and maximum bubble pressures. Using this linear approximation we consistently calculated the surface area of the bubble from the Laplace equation relating surface tension and pressure to determine the surface area vs time curves. For our system we have determined that we need to multiply the MBP surface age by 0.0783 to find the average universal surface age (a factor of 12.8 times larger). Thus we anticipate that data reported in the literature at "5 s" MBP surface age on the Kruss instrument is really at ~0.4 s universal surface age. What this means is that the longest time scale that the MBP tensiometer can measure is ~3-5 seconds universal surface age. This is typically slightly less than the minimum surface age that we measure on the Hanging Drop tensiometer (~6-8 s). So there is a small window of times between 3 and 8 seconds that one must interpolate between these two instruments. Between these two techniques, however, we can measure more than six decades of dynamic surface tension from ~1 ms-1000 s. The effect of correcting to universal surface age for both instruments is shown explicitly in FIG. 2 for Inventive Ink #11 with 0.025% ZONYL FSO. Note that the x-axis is on a log scale.

The temperature of the ink in the Maximum Bubble Pressure (MBP) apparatus was thermostatically controlled to 25° C. Because of the larger volume of the ink needed for this test this temperature was easy to maintain. We used the experimentally measured 0.80 mN/m increase in surface tension of water at 21° C. (compared to 25° C.) as a constant shift factor to correct all of the MBP data to the temperature of the Hanging Drop apparatus (21° C.).

We have combined three fitting functions to allow us to accurately model experimental dynamic surface tension data at all surface ages. At very short times and very long times the time dependence of the surface tension is known analytically so we use the known functional forms. At intermediate times we find that a power law well represents the data. We combine these three fitting regimes and constrain the model to agree at the boundaries. This combined fit model allows us to interpolate the dynamic surface tension for any desired universal surface age. The functional form of our analytical model is:

$$\sigma(t) = \begin{cases} \sigma(0) - A\sqrt{t}; & (t < t_u) \\ \sigma(1)t^v; & (t_u < t < t_1) \\ \sigma(\infty) + \dfrac{B}{\sqrt{t}}; & (t > t_1) \end{cases} \quad \text{Equation 3}$$

Note that $\sigma(\infty)$ is the equilibrium static surface tension; A, B and $v$ are constants. $\sigma(0)$ is not simply the surface tension of water, since there are often other fast acting surface active addenda present (like humectants). Note also that $\sigma(1)$ in the power law model does not necessarily match the surface tension predicted by the combined fit at 1 second surface age. This will only be true if 1 second is within the power law fit region. The combined fit parameters for Inventive Ink #11 with 0.025% ZONYL FSO and Comparative Ink #4 with 0.4% TERGITOL 15-s-12 are shown in Table 3.

TABLE 3

Combined fit parameters for Inventive Ink #11 with 0.025% ZONYL
FSO and Comparative Ink #4 with 0.4% TERGITOL 15-s-12.

| Formulation | | Combined Fit Parameters | | | | | | | |
|---|---|---|---|---|---|---|---|---|---|
| surfactant | (w/w) % | sigma0 | sigma1 | sigma eq | A | v | tu | tl | B |
| zonyl FSO | 0.0250% | 64.82 | 57.35 | 35.96 | 7.46 | −0.0656 | 1.02 | 19.42 | 49.56 |
| Tergitol 15-s-12 | 0.4000% | 63.29 | 48.53 | 45.33 | 85.05 | −0.0246 | 0.011 | 2.06 | 3.37 |

Note that the constraints that the fitting functions are equal at the upper ($t_u$) and lower ($t_l$) time boundaries of the power law region leave only six independent parameters in this combined fit model. In our model A and B are calculated from the other fit parameters:

$$A = \frac{\sigma(0) - \sigma(1)t_u^v}{\sqrt{t_u}} \qquad \text{Equation 4}$$

$$B = (\sigma(1)t_l^v - \sigma(\infty))\sqrt{t_l} \qquad \text{Equation 5}$$

Figure 3:
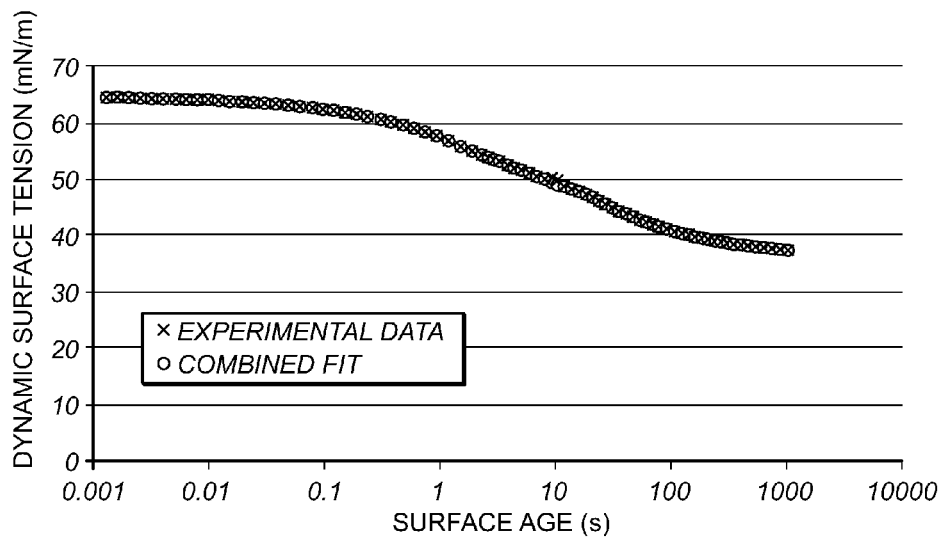
FIG. 3 is a graph of dynamic surface tension data for Inventive Ink #11 with 0.025% ZONYL FSO from Maximum Bubble Pressure and Hanging Drop tensiometers corrected to universal surface age with the best combined fit curve.

The dynamic surface tension data for Inventive Ink #11 with 0.025% ZONYL FSO from Maximum Bubble Pressure and Hanging Drop tensiometers corrected to universal surface age with the best combined fit curve is shown in FIG. 3. Clearly this is an excellent fit over the entire six decades of universal surface age measured.

Figure 4:
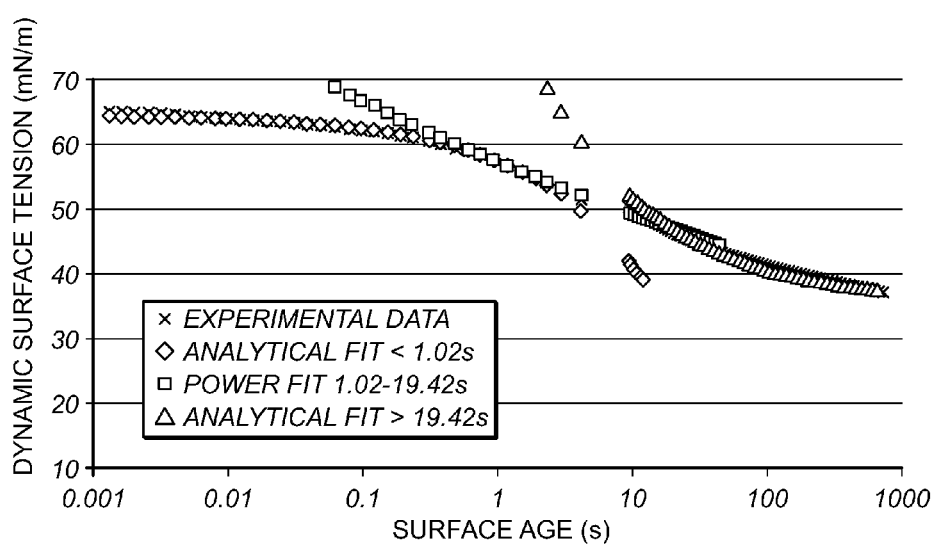
FIG. 4 is a graph of dynamic surface tension data for Inventive Ink #11 with 0.025% ZONYL FSO from Maximum Bubble Pressure and Hanging Drop tensiometers corrected to universal surface age with the individual fit curves of the best combined fit curve shown.

In FIG. 4 we show how the 3 fitting regions span the dynamic surface tension data. Clearly the power law fit between 1-20 s is necessary to accurately interpolate the dynamic surface tension in this time regime which is critical to our inventive DST metrics.

Figure 5:
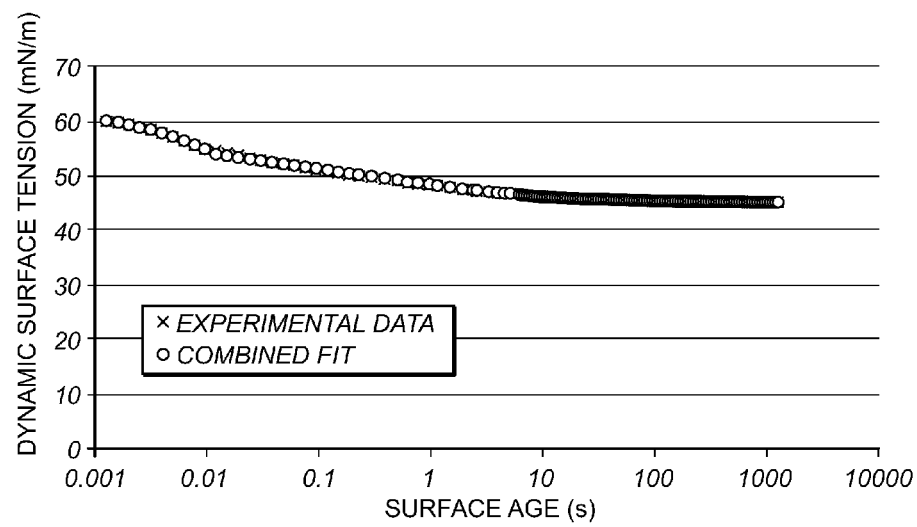
FIG. 5 is a graph of dynamic surface tension data for Comparative Ink #4 with 0.4% TERGITOL from Maximum Bubble Pressure and Hanging Drop tensiometers corrected to universal surface age with the best combined fit curve shown.
Figure 6:
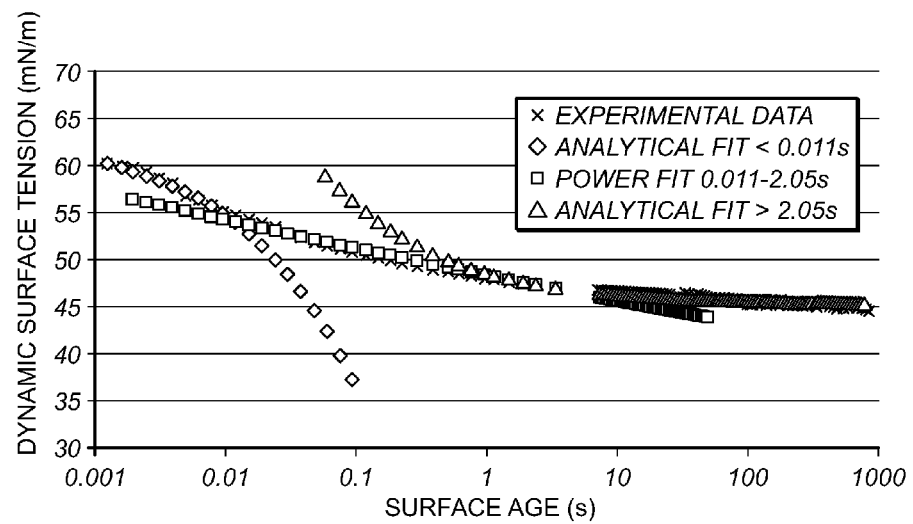
FIG. 6 is a graph of dynamic surface tension data for Comparative Ink #4 with 0.4% TERGITOL from Maximum Bubble Pressure and Hanging Drop tensiometers corrected to universal surface age with individual fit curves of the best combined fit.

FIG. 5 and FIG. 6 show the experimental data and combined fit curves for our Comparative Ink #4 with 0.4% TERGITOL 15-s-12. Once again we find an excellent fit over the entire time domain. As is typical of most surfactants, the dynamic surface tension is not changing appreciably after 10 s.

The dynamic surface tension properties of the present invention are generally achieved by the use of a dynamic surface tension agent that continues to be effective at relatively long times, so as to maintain a relatively large dynamic surface tension difference between the free surface of the applied ink and the wetting front inside the substrate over relatively long times. We believe that this surface tension difference increases the Laplace pressure and the capillary dewatering of the ink. We found the surprising result that the relevant time scales for dynamic surface tension to yield optical density improvement is much longer than was previously understood (seconds to minutes rather than milliseconds). In accordance with the present invention, such long time dynamic surface tension agents are characterized by their effect beyond the relatively longer times of 1 second universal surface age or 10 seconds universal surface age and up to 20 minutes universal surface age, in comparison, e.g., to the relatively short time requirements of the prior art teachings regarding 50 milliseconds. We have identified various surface active agents and effective concentrations thereof which may be employed to achieve the claimed dynamic surface tension differences for between 1 second or ten seconds universal surface age and 20 minutes universal surface age. In particular, we have found that fluorinated surface active agents, typically at relatively low concentrations, may be employed to obtain the desired dynamic surface tension properties of inks in accordance with the present invention.

Fluorocarbon surfactants, or fluorosurfactants, for use in the present invention may be independently selected as an nonionic, anionic, cationic or amphoteric or zwitterionic surfactant including at least one fluoro substituent on a carbon atom. In an embodiment, the fluorocarbon surfactant contains a perhalogenated or perfluorinated alkyl terminal group. The specific fluorocarbon surfactant compound or compounds selected may vary based on the other components in the ink and the properties of the one or more inks configured for printing adjacent thereto. By way of example, the fluorocarbon surfactant may be selected such that its ionic character is compatible with that of other components in the inks to avoid or minimize precipitation or flocculation in the ink.

In an embodiment, the fluorocarbon surfactant is of formula $(R_f(Q)_n A$ wherein: $R_f$ is a perfluoroalkyl group having 6 to 22 carbon atoms; Q is a divalent bridging group capable of connecting the $R_f$ with the A group; A is a water soluble group; and n is 1 or 2.

The bridging Q group may be a di-radical of alkyl, aralkyl, alkylaryl, or aryl containing less than 10 carbon atoms, and may contain heteroatoms such as S, O, and N. The linkage between the bridging Q group and the water-soluble A group may be ether, ester, amide, or sulfoamido; provided it is stable under the conditions of use.

The water-soluble A group may be selected from —$(OCH_2CH_2)_xOH$ wherein x is 1 to 12; —COOM and —$SO_3M$ wherein M is hydrogen, ammonium, amine, or an alkali metal such as lithium, sodium, or potassium; —$PO_4$; wherein y is 1 to 2 and Z is hydrogen, ammonium, amine, or an alkali metal such as lithium, sodium, or potassium; —$NR_3X$ wherein $R_3$ is an alkyl group of 1 to 4 carbon atoms and X is an anionic counterion selected from the group consisting of halides, acetates, and sulfonates, and other water-soluble zwitterionic groups. The balance between the size of the perfluoroalkyl group and the water-soluble group should be such that the compound as a whole has a solubility in the desired aqueous vehicle of at least 0.001% at 25° C., preferably at least 0.05% at 25° C. Suitable fluorinated compounds are commercially available from companies such as E. I. du Pont de Nemours and Company (Wilmington, Del.) as ZONYL and CAPSTONE surfactants, and from 3M Company (Minneapolis, Minn.) as FLUORAD surfactants, which may be used alone or in combinations.

In the ZONYL series of fluorocarbon surfactants, ZONYL FSO, ZONYL FSN, ZONYL FSH, and ZONYL FS-300 are exemplary nonionic fluorocarbon surfactants that may be used in the present invention. ZONYL FSO is an ethoxylated nonionic fluorocarbon surfactant having the formula $R_fCH_2CH_2O(CH_2CH_2O)_xH$, wherein $R_f$ is $F(CF_2CF_2)_y$, x is 0 to approximately 15, and y is 1 to approximately 7. As supplied, ZONYL FSO has about 50% fluorosurfactant. ZONYL FSN is a water soluble, ethoxylated non-ionic fluorosurfactant that has the structure of $R_fCH_2CH_2O(CH_2CH_2O)_xH$, wherein $R_f$ is $F(CF_2CF_2)_y$, x is 0 to approximately 25, and y is 1 to approximately 9. ZONYL FSN is supplied having about 40% fluorosurfactant. ZONYL FS-300 is a nonionic fluorosurfactant having the structure $R_fCH_2CH_2O(CH_2CH_2O)_xH$, wherein $R_f$ is $F(CF_2CF_2)_y$, x is 3 to approximately 30, and y is 2 to approximately 20, wherein X<y<Z. As supplied, ZONYL FS-300 has about 40% fluorosurfactant. ZONYL FSD is an exemplary cationic fluorosurfactant and has the structure $F(CF_2CF_2)_{1-7}$-alkyl-$N^+R_3Cl^-$. ZONYL FSD is supplied having about 30% fluorosurfactant. ZONYL FS-500 in an exemplary amphoteric fluorosurfactant and has the structure $C_6F_{13}CH_2CH_2SO_2NHC_3H_6N^+(CH_3)_2CH_2COO^-$.

ZONYL FSA, ZONYL FSP, and ZONYL FSE are exemplary anionic fluorocarbon surfactants that may be used in the present invention. ZONYL FSA is a water soluble lithium carboxylate anionic fluorosurfactant. ZONYL FSE and ZONYL FSP are water-soluble, anionic phosphate fluorosurfactants.

The FLUORAD fluorocarbon surfactants include ammonium perfluoroalkyl sulfonates (FC-120), potassium fluorinated alkyl carboxylates (FC-129), fluorinated alkyl polyoxyethylene ethanols (FC-170C), fluorinated alkyl alkoxylate (FC-171), and fluorinated alkyl ethers (FC-430, FC-431, FC-740).

Other suitable fluorosurfactants include NOVEC 4430 (a fluorosurfactant commercially available from 3M located in St. Paul, Minn.), NOVEC 4432 (a non-ionic fluorosurfactant commercially available from 3M), and NOVEC 4434 (a water-soluble non-ionic fluorosurfactant commercially available from 3M).

Other suitable fluorocarbon surfactants in the practice of the invention include those formed at least in part from a polymer made based on oxetane chemistry having the formula below and including a pendant perfluoroalkyl group $R_f$

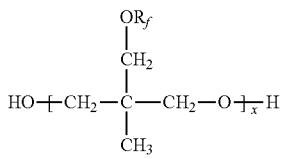

wherein the length of the pendant perfluoroalkyl group is selected from the group consisting of $C_4F_9$ or shorter including $CF_3$, $C_2F_5$, $C_3F_7$ and $C_4F_9$.

In an embodiment, the oxetane-based fluorocarbon surfactant is formed from at least a polymeric material having at least one polar group and having at least one pendant group comprising an $R_f$ group, the polymeric material having at least 2 repeat units, wherein each at least one polar group, independently, is selected from a group consisting of an anion-countercation; a cation-counteranion; an amphoteric group, and a non-ionic group; wherein each $R_f$ group, independently, is selected from a group consisting of a fluorinated linear alkyl having from 1 to about 7 carbon atoms; and a fluorinated branched alkyl wherein the longest chain is from 1 to about 7 carbon atoms and each branch, independently, contains from 1 to about 3 carbon atoms; and wherein each $R_f$, whether linear or branched, has at least one carbon atom bonded to at least one fluorine atom; and wherein each $R_f$ group, independently, has at least 10% of the non-carbon atoms being fluorine atoms and the remaining non-carbon atoms being independently selected from the group consisting of: H, I, Cl, and Br.

Examples of suitable oxetane-based fluorocarbon surfactants, include, but are not limited to those generally available from companies such as Omnova Solutions, Inc. of Fairlawn, Ohio under the trade name of POLYFOX fluorocarbon surfactants. Exemplary POLYFOX surfactants include POLYFOX PF-136A, POLYFOX PF-151N, POLYFOX PF-154N, and POLYFOX PF-156A.

Effective concentrations of the dynamic surface active agent will be dependent upon the composition of the dynamic surface agent and other components of the ink, but in general may be up to about 1 wt %, preferably up to about 0.18 wt %, more preferably up to about 0.10 wt %, and even more preferably up to about 0.09 wt %. The dynamic surface tension agent is preferably present in at least a concentration of about 0.005 wt %, more preferably at least about 0.01 wt %. The surface active component can be, e.g., a polymer (which is slow to diffuse to the surface) or a fluorinated surfactant (which is slow to rearrange at the surface).

One method to maintain the specified difference in dynamic surface tensions is to use a low concentration of fluorosurfactant which is slow to drop the surface tension because it is both slow diffusing and slow to intercalate into the air water interface so that we maintain a large difference between the surface tension at the wetting front and the free surface and thus a large driving force for capillary dewatering of the ink at long time scales (e.g., 10 seconds to 20 minutes). Even within the class of fluorosurfactants, however, it has been found that different types of fluorosurfactants may be advantageously employed at different concentrations to obtain the advantages of the present invention.

The inventors have found, e.g., that a wide range of fluorosurfactants such as those specified above may be employed in the present invention to attain the specified dynamic surface tension differences at times between 1 or 10 seconds and 20 minutes universal surface age for improved optical density when the concentration range of the fluorosurfactant is between, e.g., 0.005% and 0.1% by weight, and more preferably 0.01 and 0.09% by weight, when not used with excessive concentrations of humectants, co-solvents or other addenda that themselves display significant surface activity. This fluorosurfactant concentration range is considerably below the range of surfactant concentrations used more generally in formulations typical of the art. Formulating an ink at low fluorosurfactant concentration surprisingly has still been found to achieve low static surface tensions, and may also advantageously yield improved jetting characteristics, improved stability of the pigments in solution, or simply have a reduced cost.

While very low concentrations of less than or equal to about 0.1 wt % or 0.09 wt % are generally useful for all fluorosurfactants, selected fluorosurfactants have been identified which surprisingly may be employed at somewhat higher concentrations (e.g., up to 0.2 wt %, up to 0.5 wt %, or even up to 1 wt % or more), and still provide the specified dynamic surface tension differences at times between 1 or 10 seconds and 20 minutes universal surface age for improved optical density, again when not used with excessive concentrations of humectants, co-solvents or other addenda that themselves display significant surface activity. Use of anionic fluorosurfactants comprising phosphate groups, such as ZONYL FSE and ZONYL FSP, e.g., may be used at relatively higher concentrations including, e.g., up to about 1 wt %, in order to provide both the required DST difference over longer times, as well as good felt wetting characteristics. In one embodiment, an anionic fluorosurfactant comprising a phosphate group is preferably present in a concentration of from 0.005 wt % to 1 wt %, more preferably 0.01 wt % to 1 wt %, more preferably 0.1 wt % to 1 wt %, and most preferably 0.2 wt % to 1 wt % to provide both improved optical density and good felt wetting. To optimize optical density improvements, the upper concentration limits within such ranges further may preferably be limited to less than 0.5 wt %.

Surface active addenda may interfere with the inventive surfactants if they significantly drop the surface tension at the relevant 1-10 second time scales. These addenda can be surface active solvents (humectants) or combinations of different surfactants. For each surface active addenda we anticipate two characteristic concentrations of importance. Below the lower critical concentration ($c_l$) the addition of a second surface active addenda will not impact the utility of our inventive surfactants because there is simply not enough surface activity of the secondary surface active addenda to matter at the time scales of interest. At and above the upper critical concentration ($c_u$) the second surface active addenda dominates our inventive surfactant and there is no enhancement of optical density because the difference in dynamic surface tension is too small. Between the lower and upper critical concentrations, the second surface active addenda will reduce the desired difference in dynamic surface tension and reduce the gain in optical density. Our invention may still have utility in this concentration range, but the optical density gain is not maximized. The specific interactions of the secondary surface active addenda with our inventive surfactant (for instance if they micellize separately or form mixed micelles) will determine the exact upper and lower critical concentrations for a given secondary surface active addenda.

It is desirable to achieve fast enough felt wetting to allow printing. This can be achieved by having a combination of low static surface tension caused by the addition of a sufficient quantity of surfactant or strong chemical affinity of the ink for the wicking fibers of the felt which is primarily driven by the selection of humectants and the polymeric binders. For a specific printing application one can improve felt wetting by matching the solubility parameters of the addenda to the felt used in the printer. Addition of a further surfactant to achieve a low surface tension to improve felt wetting, however, generally compromises the effect of our inventive surfactants. We have found that one can optimize the selection of humectants and addenda to maximize felt wetting while maintaining improved density. In certain embodiments, use of a fluorosurfactant at a concentration of at least 0.01 wt % may be preferred to obtain improved felt wetting performance.

The ink of the invention may further comprise non-fluorinated surfactants for various purposes at concentrations such that the difference between the dynamic surface tension measured at 1 or 10 seconds and the dynamic surface tension measured at 20 minutes is maintained. The further surfactants may be anionic, cationic, amphoteric or nonionic. Examples of suitable further nonionic surfactants include, linear or secondary alcohol ethoxylates (such as the TERGITOL 15-S and TERGITOL TMN series available from Union Carbide and the BRIJ series from Uniquema), ethoxylated alkyl phenols (such as the TRITON series from Union Carbide), fatty acid ethoxylates, fatty amide ethoxylates, ethoxylated and propoxylated block copolymers (such as the PLURONIC and TETRONIC series from BASF, ethoxylated and propoxylated silicone based surfactants (such as the SILWET series from CK Witco), alkyl polyglycosides (such as the GLUCOPONS from Cognis) and acetylenic polyethylene oxide surfactants (such as the SURFYNOLS from Air Products).

Examples of further anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the STRODEX series from Dexter Chemical), phosphonated and amine oxide surfactants and anionic fluorinated surfactants. Examples of further amphoteric surfactants include; betaines, sultaines, and aminopropionates. Examples of further cationic surfactants include; quaternary ammonium compounds, cationic amine oxides, ethoxylated fatty amines and imidazoline surfactants. Additional examples of the above surfactants are described in "McCutcheon's Emulsifiers and Detergents: 2003, North American Edition".

Ink compositions of the present invention are aqueous-based. By aqueous-based, it is meant that the majority of the liquid components in the ink composition are water, preferably greater than 50% water and more preferably greater than 60% water.

The water compositions useful in the invention may also include humectants and/or co-solvents in order to prevent the ink composition from drying out or crusting in the nozzles of the printhead, aid solubility of the components in the ink composition, or facilitate penetration of the ink composition into the image-recording element after printing. The humectants and/or co-solvents should be selected such that the difference between the dynamic surface tension measured at 1 or 10 seconds universal surface age and the dynamic surface tension measured at 20 minutes universal surface age is maintained. This may be generally accomplished through selecting humectants with a static surface tension of at least about 36 mN/rn at 25° C. Non-limiting examples of such humectants are 1,3-propanediol, 3-methyl-,1,3-butanediol, glycerol, 2-pyrrolidinone, ethylene glycol, diethylene glycol, and various low Mw polyethylene glycols.

Where for other purposes it is desired to use a humectant that has a static surface tension of less than about 36 mN/m at 25° C., and in particular less than 35 mN/rn at 25° C., it is preferable that it be present in the ink of the invention below its upper critical concentration, and more preferably below its lower critical concentration. These concentrations will need to be determined empirically, but a useful non limiting guideline is that it should be present at less than 1 wt %. A particularly useful humectant with a static surface tension of less than 36 mN/m is 1,2 hexanediol, which can be employed in a preferable embodiment where a fluorinated surfactant is also present at less than or equal to 0.1 wt %. In a further embodiment, when any humectants having a static surface tension of less than 35 mN/rn at 25° C. are employed, it is preferable that such humectants are present at a combined concentration of less than 1 wt %.

Representative examples of humectants and co-solvents used in aqueous-based ink compositions include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, polyethylene glycol, polypropylene glycol, 1,2-propane diol, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol, glycerol, 1,2,6-hexanetriol, 2-ethyl-2-hydroxymethyl-propane diol, saccharides and sugar alcohols and thioglycol; (3) lower mono- and di-alkyl ethers derived from the polyhydric alcohols; such as, ethylene glycol monomethyl ether, ethylene glycol monobutyl ether, ethylene glycol monoethyl ether acetate, diethylene glycol monomethyl ether, and diethylene glycol monobutyl ether acetate (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide and tetramethylene sulfone.

The ink compositions of the invention are preferably pigment-based because such inks render printed images having higher optical densities and better resistance to light and ozone image degradation as compared to printed images made from other types of colorants. Pigments that may be used in the invention include those disclosed in, for example, U.S. Pat. Nos. 5,026,427; 5,086,698; 5,141,556; 5,160,370; and 5,169,436. The exact choice of pigments will depend upon the specific application and performance requirements such as color reproduction and image stability.

Pigments suitable for use in the invention include, but are not limited to, azo pigments, monoazo pigments, disazo pigments, azo pigment lakes, (3-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50, and mixtures thereof.

Self-dispersing pigments that are dispersible without the use of a dispersant or surfactant may also be useful in the invention. Pigments of this type are those that have been subjected to a surface treatment such as oxidation/reduction, acid/base treatment, or functionalization through coupling chemistry, such that a separate dispersant is not necessary. The surface treatment can render the surface of the pigment with anionic, cationic or non-ionic groups. See for example, U.S. Pat. No. 6,494,943 B1 and U.S. Pat. No. 5,837,045. Examples of self-dispersing type pigments include CAB-O-JET 200 and CAB-O-JET 300 (Cabot Specialty Chemicals, Inc) and BONJET CW-1, CW-2 and CW-3 (Orient Chemical Industries, Ltd.). In particular, a self-dispersing carbon black pigment ink may be employed in the ink set of the invention, wherein ink comprises a water soluble polymer containing acid groups neutralized by an inorganic base, and the carbon black pigment comprises greater than 11 weight % volatile surface functional groups as disclosed in U.S. Patent Application Publication No. 2008/0206465, the disclosure of which is incorporated by reference herein.

Pigment-based ink compositions useful in the invention may be prepared by any method known in the art of ink jet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill such as a media mill, a ball mill, a two-roll mill, a three-roll mill, a bead mill, and air jet mill, an attritor, or a liquid interaction chamber. In the milling step (a), pigments are optionally suspended in a medium which is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of ink jet printing. For aqueous pigment-based ink compositions, useful dispersants include anionic, cationic or nonionic surfactants such as sodium dodecylsulfate, or potassium or sodium oleylmethyltaurate as described in, for example, U.S. Pat. No. 5,679,138; U.S. Pat. No. 5,651,813 or U.S. Pat. No. 5,985,017.

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic or nonionic polymers; or random, block, branched or graft polymers. Polymeric dispersants useful in the milling operation include random and block copolymers having hydrophilic and hydrophobic portions; see for example, U.S. Pat. No. 4,597,794; U.S. Pat. No. 5,085,698; U.S. Pat. No. 5,519,085; U.S. Pat. Nos. 5,272,201; 5,172,133; or U.S. Pat. No. 6,043,297, and PCT Patent Publication Number WO 2004/111140A1; and graft copolymers; see for example, U.S. Pat. No. 5,231,131; U.S. Pat. No. 6,087,416; U.S. Pat. No. 5,719,204; or U.S. Pat. No. 5,714,538. Among these polymeric dispersants anionic polymeric dispersants are especially useful.

Polymeric dispersants useful for dispersing the pigment particles employed in the present invention are not limited in the arrangement of the monomers comprising the dispersant. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Polymeric dispersants useful for dispersing the pigment particles can be selected from acrylics and styrene-acrylics. Styrene-acrylic polymeric dispersants especially useful in the present invention are copolymers of styrenic monomers and carboxylate monomers. Examples of such dispersants include copolymers of styrene or alphamethyl styrene and acrylic acid or methacrylic acid (such as the JONCRYL (BASF) or TRUDOT (Mead Westvaco) polymers) or styrene maleic anhydride and styrene maleic anhydride amic acid copolymers (such as SMA-1440, SMA-17352, SMA-1000, SMA-2000 (Sartomer Inc.)).

Acrylic polymeric dispersants useful in the present invention are typically formed from one or more acrylic monomer and one or more ionizable monomer, such as, for example carboxylated or sulfonated monomers. Acrylic polymeric dispersants are typically formed from one or more hydrophobic acrylate monomer including, for example, methylmethacrylate, ethylmethacrylate, butylmethacrylate, hexylmethacryate, octylmethacrylate and decylmethacrylate.

Other especially useful polymeric dispersants are those where the hydrophobic monomer is selected from benzyl methacrylate or acrylate, or from acrylic acid esters containing an aliphatic chain having twelve or more carbons and where the hydrophilic monomer is a carboxylated monomer. Examples of acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, and decyltetradecyl methacrylate. Preferably the methacrylate or acrylate monomer is stearyl or lauryl methacrylate or acrylate. The hydrophobic portion of the polymer may be prepared from one or more of the hydrophobic monomers. Desirable carboxylated hydrophilic monomers are acrylic acid or methacrylic acid, or combinations thereof.

In one exemplary embodiment, the pigment particles are dispersed with a copolymer where the hydrophobic monomer is benzyl methacrylate and is present from 50 weight percent to 80 weight percent relative to the total weight of the polymeric dispersant and the hydrophilic monomer is methacrylic acid.

In a second embodiment, copolymer dispersants are employed which comprise a hydrophobic monomer having a carbon chain length of greater than or equal to 12 carbons present in an amount of at least 10% by weight of the total copolymer, and more desirably greater than 20% by weight, an optional additional hydrophobic monomer comprising an aromatic group and a hydrophilic monomer that is methacrylic acid. For example, the additional aromatic group containing monomer may be benzyl acrylate or benzyl methacrylate. An especially useful additional monomer is benzyl methacrylate.

The total amount of hydrophobic monomers, comprising the monomer having a chain with greater than or equal to 12 carbons and optionally, monomer containing an aromatic group, may be present in the polymer in an amount of 20 to 95% by weight of the total polymer. The hydrophobic aromatic-group containing monomer may be present in an amount from about 0 to 85% by weight of the total polymer, more typically from about 0 to 60%, and desirably from about 0 to 50%. A particularly useful embodiment of a polymeric dispersant for the pigment particles is a terpolymer of benzyl methacrylate, stearyl methacrylate and methacrylic acid. Particularly useful polymeric pigment dispersants are further described in US Patent Publication Numbers 2006/0012654 and 2007/0043144, the disclosures of which are incorporated by reference herein.

Composite colorant particles having a colorant phase and a polymer phase are also useful in aqueous pigment-based inks of the invention. Composite colorant particles are formed by polymerizing monomers in the presence of pigments; see for example, U.S. 2003/0199614, U.S. 2003/0203988, or U.S. 2004/0127639. Microencapsulated-type pigment particles are also useful and consist of pigment particles coated with a resin film; see for example U.S. Pat. No. 6,074,467.

The pigments used in the ink composition of the invention may be present in any effective amount, generally from 0.1 to 10% by weight, and preferably from 0.5 to 6% by weight.

Ink jet ink compositions may also contain non-colored particles such as inorganic particles or polymeric particles. The use of such particulate addenda has increased over the past several years, especially in ink jet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548 B2 describes the use of a water-dispersible polymeric latex in dye-based inks in order to improve light and ozone resistance of the printed images.

The ink composition may contain non-colored particles such as inorganic or polymeric particles in order to improve gloss differential, light and/or ozone resistance, waterfastness, rub resistance and various other properties of a printed image; see for example, U.S. Pat. No. 6,598,967 B1 or U.S. Pat. No. 6,508,548 B2. Colorless ink compositions that contain non-colored particles and no colorant may also be used. For example US2006/0100307A1 describes an ink jet ink comprising an aqueous medium and microgel particles. Colorless ink compositions are often used in the art as "fixers" or insolubilizing fluids that are printed under, over, or with colored ink compositions in order to reduce bleed between colors and waterfastness on plain paper; see for example, U.S. Pat. No. 5,866,638 or U.S. Pat. No. 6,450,632 B1. Colorless inks are also used to provide an overcoat to a printed image, usually in order to improve scratch resistance and waterfastness; see for example, U.S. 2003/0009547 A1 or E.P. 1,022, 151 A1. Colorless inks are also used to reduce gloss differential in a printed image; see for example, U.S. Pat. No. 6,604,819 B2; U.S. 2003/0085974 A1; U.S. 2003/0193553 A1; or U.S. 2003/0189626 A1.

Examples of inorganic particles useful in the invention include, but are not limited to, alumina, boehmite, clay, calcium carbonate, titanium dioxide, calcined clay, aluminosilicates, silica, or barium sulfate.

For aqueous-based inks, polymeric binders useful in the invention include water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fusible, or heavily cross-linked and can have a wide range of molecular weights and glass transition temperatures.

Examples of useful polymeric binders include styrene-acrylic copolymers sold under the trade names JONCRYL (S.C. Johnson Co.), UCAR (Dow Chemical Co.), JONREZ (MeadWestvaco Corp.), and VANCRYL (Air Products and Chemicals, Inc.); sulfonated polyesters sold under the trade name EASTMAN AQ (Eastman Chemical Co.); polyethylene or polypropylene resin emulsions and polyurethanes (such as the WITCOBONDS from Witco). These polymers are preferred because they are compatible in typical aqueous-based ink compositions, and because they render printed images that are highly durable towards physical abrasion, light and ozone.

The non-colored particles and binders useful in the ink composition of the invention may be present in any effective amount, generally from 0.01 to 20% by weight, and preferably from 0.01 to 6% by weight. The exact choice of materials will depend upon the specific application and performance requirements of the printed image.

Ink compositions may also contain water-soluble polymer binders. The water-soluble polymers useful in the ink composition are differentiated from polymer particles in that they are soluble in the water phase or combined water/water-soluble solvent phase of the ink. The term "water-soluble" is meant herein that when the polymer is dissolved in water and when the polymer is at least partially neutralized the resultant solution is visually clear. Included in this class of polymers are nonionic, anionic, amphoteric and cationic polymers. Representative examples of water soluble polymers include, polyvinyl alcohols, polyvinyl acetates, polyvinyl pyrrolidones, carboxy methyl cellulose, polyethyloxazolines, polyethyleneimines, polyamides and alkali soluble resins; polyurethanes (such as those found in U.S. Pat. No. 6,268,101), polyacrylic type polymers such as polyacrylic acid and styrene-acrylic methacrylic acid copolymers (such as; as JONCRYL 70 from S.C. Johnson Co., TRUDOT™ IJ-4655 from MeadWestvaco Corp., and VANCRYL 68S from Air Products and Chemicals, Inc.

Examples of water-soluble acrylic type polymeric additives and water dispersible polycarbonate-type or polyether-type polyurethanes which may be used in the inks of the ink sets of the invention are described in U.S. Patent Application Publication Nos. 2008/0207820 and 2008/0207811, the disclosures of which are incorporated by reference herein. Polymeric binder additives useful in the inks of the ink set of the invention are also described in for example US 2006/0100307A1 and US2006/0100308A1, also incorporated by reference herein.

A biocide may be added to an ink jet ink composition to suppress the growth of micro-organisms such as molds, fungi, etc. in aqueous inks. Preferred biocides for an ink composition include PROXEL GXL (Zeneca Specialties Co.) and KORDEK MLX (Dow Chemical Company) at a final concentration of 0.0001-0.5 wt. %. Additional additives which may optionally be present in an ink jet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

The pH of the aqueous ink compositions of the invention may be adjusted by the addition of organic or inorganic acids or bases. Useful inks may have a preferred pH of from about 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

The exact choice of ink components will depend upon the specific application and performance requirements of the printhead from which they are jetted. Thermal and piezoelectric drop-on-demand printheads and continuous printheads each require ink compositions with a different set of physical properties in order to achieve reliable and accurate jetting of the ink, as is well known in the art of inkjet printing. Desired viscosities are typically no greater than 20 cP, and preferably in the range of about 1.0 to 6.0 cP.

The ink must be stable against flocculation in the ink tank so that it does not plug the inkjet head and jet poorly. Jetting performance degrades as the effective particle size of pigments in the inks increases above about 150 nm. For pigmented inks this stability constraint necessitates the addition of well designed dispersants that create stable inks with a combination of either large zeta potentials or polymeric (steric) stabilization. This also limits the addition of salts that can destabilize electrostatically stabilized dispersions and polymers that can cause bridge flocculation. Flocculation stability needs to be sufficiently robust to withstand long hold times as the ink is stored before use, temperature variations during storage, delivery, and jetting, or mechanical agitation such as shear in the ink delivery system.

Back pressure constraints on some typical ink delivery systems may require that the ink viscosity is less than 7 cp. For good jetting performance of the ink in the inkjet head specifically for thermally stimulated drop on demand inkjet printing requires preferably less than 2.5 cp viscosity. The viscosity is determined by the selection of type and interaction between polymers, surfactants, humectants, dispersants and pigments. The viscosity constraint limits the Mw and concentration of polymeric addenda and the total solids content. The ink also cannot have a large elongational viscosity caused by the presence of high Mw polymers (or strongly associating chains of monomers) or the ink will not break into droplets.

This invention is particularly useful in continuous inkjet systems, or where other pressurized (or novel) ink delivery methods do not require felt wetting. The necessity of wetting felt requires co-optimization of the inventive formulations, and such co-optimization typically yields reduced optical density gains. In contrast, unconstrained by felt wetting, the inventive inks can be optimized for further enhanced optical density. Thus we do not require good felt wetting as a constraint for defining our inventive inks although it does shape our preferred embodiments intended for drop-on-demand applications.

The jetting process employed introduces additional constraints to the ink. The need for repeated reproducible firing and good jetting restart after a delay limit the use of polymers or formulation addenda that adhere to and do not redissolve from the heated surfaces of the jetting fixture. It is particularly undesirable for an ink to form insoluble build-up upon heating (kogation). These constraints are particularly limiting upon the type of polymeric addenda. Drop uniformity, satellite formation and print window are impacted by the pigment size and distribution, extensional viscosity, and surface tension which can also be impacted by the addition of polymer addenda. Having a small amount of moderate to high Mw polymer addenda can increase extensional viscosity and suppress satellites improving drop break-up and reducing drop placement errors in printing. These jetting performance attributes can be improved for specific fluids by optimizing the waveform of the drop break-up stimulation pulses. However, generally, having materials that give a robust jetting performance is desirable so that this sort of optimization is not required.

The choice of humectants and surfactant directly impacts the redispersibility of dried ink. This is critical in continuous inkjet systems because the ink that is not printed is redirected to a gutter and recycled. Thus the ink must have a stable and robust humectant and surfactant package so that the ink can be recycled without forming flocculates. The choice of surfactant and humectants also impacts the drying rate and absorption rate into the paper. If inks are not absorbed fast enough they can bleed. In addition, the overprinting of one color ink by a second color ink to give continuous color tone requires the appropriate ordering of the static and dynamic surface tensions of the inks so that subsequent ink droplets are not repelled when they impact an ink drop laid down earlier.

Ink permanence requires that the pigments are not too close to the surface so that they can be physically abraded (scratched). If the pigments are drawn below the surface of the paper they are protected from abrasion, but at the expense of reduced optical density. One can add an overcoat using a layer of polymer, latex or surfactant to provide protection. Clearly the requirement of image permanence is typically in direct opposition to the desire for large optical densities.

For color inkjet printing, a minimum of cyan, magenta and yellow inks are required for an ink set which is intended to function as a subtractive color system. Very often black ink is added to the ink set to decrease the ink required to render dark areas in an image and for printing of black and white documents such as text. The need to print on both microporous photoglossy and plain paper receivers can make desirable a plurality of black inks in an ink set. In this case, one of the black inks may be better suited to printing on microporous photoglossy receivers while another black ink may be better suited to printing on plain paper. Use of separate black ink formulations for this purpose can be justified based on desired print densities, printed gloss, and smudge resistance for the type of receiver.

Other inks can be added to the ink set. These inks include light or dilute cyan, light or dilute magenta, light or dilute black, red, blue, green, orange, gray, and the like. Additional inks can be beneficial for image quality but they add system complexity and cost. Finally, colorless ink composition can be added to the ink jet ink set for the purpose of providing gloss uniformity, durability and stain resistance to areas in the printed image which receive little or no ink otherwise. Even for image areas printed with a significant level of colorant containing inks, the colorless ink composition can be added to those areas with further benefits. An example of a protective ink for the above purposes is described in US2006/0100306A1 and US2006/0100308A1.

According to a further embodiment of the present invention, a method of printing on a substrate using an inkjet print-head with the inkjet ink of the invention is described. It is preferable that the substrate be water absorbent, particularly plain or bond paper. The design of the plain paper or bond paper varies widely depending on materials and paper manufacturing processes which should not be construed to limit the scope of the present invention.

EXAMPLES

Prior to making ink formulations we first created Black Pearls 700 (BP700) pigment dispersions according to the following method. Weigh BP700 pigment into the milling vessel. Add dispersant (a 65/10/25 weight ratio copolymer of benzyl methacrylate/stearyl methacrylate/methacrylic acid neutralized with dimethylaminoethanol) at a level that is 15% by weight of the pigment level. Add water so that % pigment in the dispersion is approximately 15%. Add milling media (typically styrene/divinyl benzene 20/80 polymeric beads) equal in weight to the total dispersion weight. Combine these materials and mix slowly at ~300 RPM on the media mill which is fitted with a Cowles blade. Continuously cool by pumping chilled water through the dispersion vessel. After the dispersion has thinned some, increase to ~1500 RPM until a reasonable mixing is obtained. Mill dispersion for 24 hours. Filter off beads using high pressure filter apparatus and measure the particle size and % solids of the pigment dispersion.

The ink formulations in Table 7 were prepared by combining enough Black Pearls 700 (BP700) pigment dispersion to give 4.5 wt % BP700 pigment, 12.00 wt % 1,3-propanediol, 3.00 wt % polyethylene glycol (400 mw, labeled PEG-400), and 0.20 wt % triethylamine (TEA), with the type and wt % of surfactant added indicated in Table 7, with the balance as water. This ink formulation was used for Inventive Inks #1-17 and Comparative Inks #1-8. For example, Comparative Ink #4 was made by adding 4.5 wt % Black Pearls 700 pigment (BP700), 12.00 wt % 1,3-propanediol, 3.00 wt % PEG-400 and 0.20 wt % TEA, with 0.4 wt % of TERGITOL 15-s-12 surfactant. After each of the inks was prepared, a drawdown was made by placing 3 drops of ink onto three porous substrates and drawdown using a #3 coating rod. Porous substrate 1 was a Georgia Pacific Premium Multi-Use Paper (P1), porous substrate 2 was Georgia Pacific Inkjet Paper (P2) and porous substrate 3 was HP Multipurpose Paper (P3). Densities were read using a MacBeth densitometer. Each density was read at least three times and averaged.

Comparative Ink #4 was our control ink used to calculate the optical density gain metric shown in Table 7. The optical density gain metric that we report shows the average gain, the smallest gain and the largest gain from the three porous substrates. It was found by subtracting the optical density of Comparative Ink #4 from the optical density of our sample ink on the same porous substrate and averaging the result for the three porous substrates. This average gain is compared to the following table to determine the first letter of our metric:

TABLE 4

Optical Density Gain Metric

| |
|---|
| H = gain in OD greater than 0.275 |
| E = gain in OD between 0.225 to .275 |
| S = gain in OD between 0.175 to .225 |
| A = gain in OD between 0.125 to 0.175 |
| B = gain in OD between 0.075 to 0.125 |
| C = gain in OD between 0.025 and 0.075 |
| D = gain in OD less than 0.025 |

The second letter of our metric represents the smallest gain found from any of the porous substrates while the third letter of our metric represents the largest gain from any of the porous substrates.

In Table 5 we show an example calculation of the optical density gain metric for Inventive Ink #11 relative to Comparative Ink #4. Comparative Ink #4 has 0.4% TERGITOL 15-s-12 and gave 0.928 OD on P1 paper, 1.190 OD on P2 paper, and 1.070 OD on P3 paper, yielding an average of 1.062 OD for Comparative Ink #4 on these three plain bonded papers. The OD values for Inventive Ink #11, which has 0.025% ZONYL FSO surfactant, is shown in Table 5. The difference in optical density from Comparison ink #4 (labeled "delta OD") is tabulated for each paper and averaged for the 3 papers. These values are compared to Table 4 to yield the Optical Density Gain Metric shown:

TABLE 5

Example Optical Density Gain Metric Calculated for Inventive Ink #11.

| Drawdown P1 | Drawdown P2 | Drawdown P3 | 3 paper average OD | delta OD P1 | delta OD P2 | delta OD P3 | 3 paper average OD | lowest delta OD | biggest delta OD | 3 paper average metric | lowest gain metric | biggest gain metric | Optical Gain Metric |
|---|---|---|---|---|---|---|---|---|---|---|---|---|---|
| 1.070 | 1.291 | 1.357 | 1.239 | 0.142 | 0.101 | 0.288 | 0.177 | 0.101 | 0.288 | S | B | H | SBH |

Thus the optical density metric for Inventive Ink #11 is SBH indicating the (average/lowest/biggest) gains in optical density which is what is reported in Table 7.

It is desirable to have at least a C felt wetting metric, more preferably at least a B and most preferably an A or better felt wetting for robust printing.

TABLE 7

Formulation and Property Data for Inventive Inks 1-17 and Comparative Inks 1-8.

| | | Formulations | | | Properties | | | | |
|---|---|---|---|---|---|---|---|---|---|
| Sample ID | # | surfactant 1 (type) | concentration (w/w) | Static ST (mN/m) | DST Metric 1 (1 s-20 m) (mN/m) | DST Metric 2 (10 s-20 m) (mN/m) | 50 ms MBP age DST >49 mM/m ? (y/n) | Drawdown Optical Density Gain Metric (ave/low/high) | Felt Wetting Metric |
| Inventive | 1 | Zonyl FSP | 0.005% | 17.4 | 28.4 | 25.3 | y | EAH | D |
| Inventive | 2 | Zonyl FSP | 0.010% | 16.2 | 35.7 | 30.1 | y | SBH | C |
| Inventive | 3 | Zonyl FSP | 0.025% | 16.1 | 37.5 | 27.7 | y | SBH | C |
| Inventive | 4 | Zonyl FSP | 0.050% | 16.2 | 39.7 | 23.7 | y | SBH | C |
| Inventive | 5 | Zonyl FSP | 0.100% | 16.7 | 38.1 | 18.2 | y | EAH | C |
| Inventive | 6 | Zonyl FSP | 0.200% | 15.5 | 31.4 | 15.1 | y | SAH | A |
| Inventive | 7 | Zanyl FSP | 0.500% | 16.2 | 33.0 | 12.4 | y | ACH | E |
| Inventive | 8 | Zonyl FSP | 1.000% | 17.5 | 29.7 | 9.8 | y | ABE | E |
| Inventive | 9 | Zonyl FSO | 0.005% | 49.1 | 10.7 | 9.3 | y | SBH | D |
| Inventive | 10 | Zonyl FSO | 0.010% | 42.2 | 17.5 | 14.1 | y | SBH | C |
| Inventive | 11 | Zonyl FSO | 0.025% | 36.0 | 20.0 | 11.9 | y | SBH | C |
| Inventive | 12 | Zonyl FSO | 0.050% | 29.0 | 20.3 | 10.8 | y | SBH | B |
| Inventive | 13 | Zonyl FSO | 0.100% | 26.3 | 15.7 | 6.1 | y | ACE | S |
| Comparative | 1 | Zonyl FSO | 0.200% | 22.9 | 11.4 | 3.1 | y | BCA | E |
| Inventive | 14 | Zonyl FS-500 | 0.005% | 38.7 | 22.4 | 15.5 | y | SSH | C |
| Inventive | 15 | Zonyl FS-500 | 0.010% | 34.9 | 24.1 | 10.1 | y | SAH | C |
| Inventive | 16 | Zonyl FS-500 | 0.025% | 27.7 | 18.7 | 5.1 | y | SSH | A |
| Inventive | 17 | Zonyl FS-500 | 0.050% | 22.6 | 23.5 | 3.0 | y | ABE | S |
| Comparative | 2 | Zonyl FS-500 | 0.100% | 20.1 | 9.2 | 2.2 | y | BCA | E |
| Comparative | 3 | Zonyl FS-500 | 0.200% | 17.7 | 7.2 | 1.0 | y | BCS | H |
| Comparative | 4 | tergtiol 15-s-12 | 0.400% | 45.3 | 3.1 | 1.0 | y | DDD | E |
| Comparative | 5 | Surfynol 465 | 0.180% | 46.3 | 2.6 | 0.3 | y | BCA | B |
| Comparative | 6 | Surfynol 465 | 0.400% | 41.8 | 0.0 | 0.0 | n | DDD | H |
| Comparative | 7 | Strodex PK90 | 0.160% | 43.2 | 3.4 | 0.5 | y | ACE | E |
| Comparative | 8 | Strodex PK90 | 0.400% | 35.6 | 0.6 | 0.2 | n | DDC | H |

A drop of the sample ink was placed on a clean polypropylene felt that is used to wick the ink into the ink jetting system from the ink tank. The time was recorded until the ink was absorbed into the felt. Felt wetting is required for inks to print robustly in inkjet systems. The felt wetting metric is explained in Table 6 and shown for our Inventive and Comparative Inks in Table 7.

TABLE 6

Felt Wetting Metric

| | | |
|---|---|---|
| H | less than 2 seconds | best inks |
| E | between 2 and 4 seconds | prints easily |
| S | between 4 and 6 seconds | prints well |
| A | between 6 and 12 seconds | prints OK |
| B | between 12 and 18 seconds | will print (may require pressure) |
| C | between 18 and 300 seconds | marginal: may print with pressure |
| D | greater than 300 seconds | poor: will not wet felt, does not print |

In Table 7 we report the static Surface Tension and two metrics for the Dynamic Surface Tension (DST) that we find predictive for optical density gain. DST Metric 1 compares the difference in dynamic surface tension at 1 second and 20 minutes universal surface age. The 1 second DST data is found by fitting Maximum Bubble Pressure DST data and Hanging Drop Tensiometer data simultaneously as previously described. DST Metric 2 compares the difference in DST at 10 seconds and 20 minutes universal surface age and is found from the Hanging Drop Tensiometer Data alone. We find improved optical density when either DST Metric 1 is greater than 15.5 mN/m or when DST Metric 2 is greater than 9.2 mN/m.

Inventive Inks #1-17 have fluorosurfactants present at sufficiently low concentrations and give excellent optical density showing the desired differences in DST. As the concentration of added fluorosurfactant increases, the gain in optical density is reduced as is the DST metrics. Comparative examples #1-3 show fluorosurfactants at higher concentrations such that they do not yield the desired difference (delta) in long time surface tensions and do not give large optical density improvements. The weight percent concentration where the optical density is no longer improved varies with the fluorosurfactant type, and it is well predicted by our DST metrics.

Comparison Inks #4-8 use traditional carbon based surfactants and typically give much poorer density than our inventive examples. This is consistent with the low values of both DST metric 1 (1 s-20 m DST) of less than 3.5 mN/m and DST metric 2 (10 s-20 m DST) of less than 11 nN/m. Comparative Inks #4-8 have acceptable felt wetting performance consistent with their robust usage in commercial inks.

All of the fluorosurfactant containing inks disclosed in Inventive Inks #1-19 give measurable and significant gains in optical density, greater than 0.225 OD, on at least one of the three porous substrates used. Clearly there is a tradeoff between optical density and felt wetting, with better optical density coming at the expense of poorer felt wetting performance. Preferred embodiments of the present invention (e.g., Examples 6-8, 12-13, 16-17) each gave greater than 0.225 OD gain on at least one of the porous substrates and acceptable felt wetting performance (not a marginal "C" or poor "D" felt wetting metric). Inventive Inks #1-5, 9-11 and 14-15 had marginal "C" or poor "D" felt wetting metrics, but may preferably be used for printing in systems where felt wetting is not required (e.g., continuous inkjet systems, or other systems employing alternative ink tank technology) in order to exploit their optical density benefits.

U.S. Pat. No. 7,862,653 teaches that for improved optical density it is desirable to have the dynamic surface tension of the ink at 49 mN/m or more at a lifetime of 50 milliseconds MBP age (maximum bubble pressure age, which corresponds to 0.4 ms universal surface age). In contrast to expectations based upon the teaching of this patent, we have found a large variation, of up to 0.25 OD in optical density performance, for inks all of which have dynamic surface tension greater 49 mN/m at a lifetime of 50 milliseconds MBP age as shown Table 7. In fact, all but two of the inks in Table 7 meet this requirement. The criterion of having high surface tension at short times (50 ms MBP age) does not dictate the optical density performance, and is thus an insufficient criterion to select the best inks. The DST metrics of the present invention, which are calculated at much longer time scales (seconds and minutes, rather than milliseconds) provide useful criteria to select the best inks for improved optical density on plain papers.

In Table 9 we show the effect of adding a second surface active addenda such as a humectant or carbon surfactant on the optical density of an ink containing 0.025% ZONYL FSO (Inventive Ink #11). The ink formulations in Table 9 were prepared by combining 4.5 wt % Black Pearls 700 pigment (BP700), 3.00 wt % polyethylene glycol (PEG-400), and 0.20 wt % triethylamine (TEA), 0.025% ZONYL FSO, with a second surface active addenda either in the form of a humectant or a carbon surfactant at the wt % indicated in Table 9, with the balance as water. In these inks the total concentration of humectant was held constant at 12 wt % with the balance not indicated in the table added as 1,3-propanediol. For example, comparative ink #13 contains 4% hexanediol and 8% 1,3-propanediol making a total of 12 wt % humectant.

The most relevant optical density control for the impact of the addition of a second surface active addenda is the optical density of the base inventive ink, Inventive Ink #11 (with 0.025% ZONYL FSO only). For this reason we have included Inventive Ink #11 in Table 9 and calculated an "optical density loss metric" using the optical density of Inventive Ink #11 as the reference. The difference between the optical density of Inventive Ink #11 and the sample inks in Table 9 were calculated on the three porous substrates averaged and compared to density metric shown in Table 8 to determine the first letter of our metric:

TABLE 8

Optical Density Loss Metric

H = no loss in OD (delta OD > 0)
E = loss in OD between 0.00 to .03
S = loss in OD between 0.03 to .055
A = loss in OD between 0.055 to 0.08
B = loss in OD between 0.08 to 0.13
C = loss in OD between 0.13 and 0.18
D = loss in OD greater than 0.18

The second letter of the loss metric represents the largest loss found from any of the three porous substrates while the third letter of our metric represents the smallest loss from any of the porous substrates. Note that any ink with a "D" rating in the optical density loss metric has an average optical density poorer than Comparative Example #4, with 0.4% TERGITOL 15-s-12.

TABLE 9

Inks with a second Surface Active Addenda.

| | | Formulations | | | | | Properties | | | | |
|---|---|---|---|---|---|---|---|---|---|---|---|
| | | | | | | | | | | Drawdown | |
| Sample ID | surfactant 1 # | (type) | amount (w/w) | Surface active addenda 2 (type) | amount (w/w) | Static ST of pure Humectant with lowest static ST (mN/m) | Static ST (mN/m) | DST Metric 1 (1 s-20 m) (mN/m) | DST Metric 2 (10 s-20 m) (mN/m) | 50 ms MBP age DST >49 mN/m? (Y/N) | Optical Density Loss Metric (ave/low/high) | Felt Wetting Metric |
| Inventive | 11 | Zonyl FSO | 0.025% | 1,3 propanediol | 12.00% | 46.20 | 35.96 | 19.96 | 11.92 | Y | HHH | C |
| Inventive | 18 | Zonyl FSO | 0.025% | 2-pyrrolidinone | 3.00% | 45.81 | 38.20 | 16.16 | 12.14 | Y | EBH | C |
| Inventive | 19 | Zonyl FSO | 0.025% | 3-methyl 1,3 butanediol | 5.00% | 35.80 | 33.43 | | 11.65 | | HEH | C |
| Comparative | 9 | Zonyl FSO | 0.025% | 3-methyl 1,5 pentanediol | 5.00% | 36.20 | 31.95 | | 9.11 | | BDA | E |

TABLE 9-continued

Inks with a second Surface Active Addenda.

| | | Formulations | | | | Properties | | | | | |
|---|---|---|---|---|---|---|---|---|---|---|---|
| Sample ID | # | surfactant 1 (type) | amount (w/w) | Surface active addenda 2 (type) | amount (w/w) | Static ST of pure Humectant with lowest static ST (mN/m) | Static ST (mN/m) | DST Metric 1 (1 s-20 m) (mN/m) | DST Metric 2 (10 s-20 m) (mN/m) | 50 ms MBP age DST >49 mN/m ? (Y/N) | Draw-down Optical Density Loss Metric (ave/low/high) | Felt Wetting Metric |
| Comparative | 10 | Zonyl FSO | 0.025% | tergitol 15-s-12 | 0.40% | 46.30 | 21.76 | 15.31 | 8.52 | Y | DDD | H |
| Comparative | 11 | Zonyl FSO | 0.025% | 2-ethyl 1,3 hexanediol | 2.00% | 34.30 | 22.53 | | 6.52 | | DDD | H |
| Comparative | 12 | Zonyl FSO | 0.025% | Strodex PK90 | 0.16% | 46.30 | 28.54 | | 6.10 | | BBA | E |
| Comparative | 13 | Zonyl FSO | 0.025% | 1,2 hexanediol | 4.00% | 23.80 | 25.31 | 6.34 | 4.32 | N | DDD | H |

The addition of a second surface active addenda to the 0.025% ZONYL FSO fluorosurfactant in Comparison Inks #9-13 results in a substantial loss of average optical density on the three substrates (at least 0.08 average OD loss). The static surface tension of a 100% solution of the lowest surface tension humectant in the formulation is indicated in the table. While the static tension of the lowest surface tension pure humectants may not predict the surface tension of the mixed water and humectant system precisely, it appears empirically that humectants with lower than ~35 mN/m static surface tension (2 ethyl 1,3 hexanediol and 1,2 hexanediol) do not allow the formulation to exhibit the desired delta in dynamic surface tension and thus have poor optical density. In contrast, for 2-pyrrolidone and 1,3 propanediol, humectants which have greater than ~37 mN/m pure static surface tension, the humectants do not significantly impact the desired delta in dynamic surface tension and thus the optical density is enhanced. We show two humectants that have ~36 mN/m pure static surface tension (5% 3-methyl 1,5 pentanediol and 5% 3-methyl 1,3 butanediol) which impact DST Metric 2 differently. In the case of 3-methyl 1,5 pentanediol both the optical density and DST metric 2 are reduced dramatically, while for 3-methyl 1,3 butanediol neither DST metric 2, nor the optical density is impacted significantly. The optical density performance is predicted well by our DST Metric 2 and correlated to the static surface tension of the humectant package.

The addition of a second surface active humectant or a second traditional surfactant clearly gives improved felt wetting yielding a felt wetting metric better than the "C" (marginal performance) found for Inventive Inks #11, 18 and 19. The desire to wet the felt to allow for printing in an ink jetting system has led those in the art to include secondary surface active addenda that destroy the optical density gain that we find from our inventive inks.

Table 10 shows the improvement in optical density that results from having a high static surface tension as a result of using a low concentration of traditional, non-fluorosurfactants. The ink formulations in Table 10 were prepared by combining 4.5 wt % Black Pearls 700 pigment (BP700), 12.00 wt % 1,3-propanediol, 3.00 wt % polyethylene glycol (400 mw, labeled PEG-400), and 0.20 wt % triethylamine (TEA), with the type and wt % of surfactant indicated, with the balance as water. These Comparative Inks #14-17 all have static surface tension greater than 50 mN/m and show good optical density gain metrics despite having low DST metrics.

TABLE 10

Examples with high static surface tensions: Comparison Inks #14-17.

| | Formulations | | | | Properties | | | | |
|---|---|---|---|---|---|---|---|---|---|
| Sample ID | # | surfactant 1 (type) | amount (w/w) | Static ST (mN/m) | DST Metric 1 (1 s-20 m) (mN/m) | DST Metric 2 (10 s-20 m) (mN/m) | 50 ms MBP age DST >49 mN/m ? (y/n) | Drawdown Optical Density Gain Metric (ave/low/high) | Felt Wetting Metric |
| Comparative | 14 | Tergitol 15-s-12 | 0.180% | 50.29 | 9.41 | 4.52 | y | ACE | C |
| Comparative | 15 | Tergitol 15-s-12 | 0.025% | 60.52 | | 0.85 | | EBH | D |
| Comparative | 16 | Surfynol 465 | 0.025% | 57.05 | 2.19 | 0.58 | y | EAH | C |
| Comparative | 17 | Strodex PK90 | 0.025% | 54.21 | 3.80 | 1.08 | y | EBH | C |

In Table 10 the DST metrics 1 and 2 are small because of the weak surface activity of the traditional surfactants at these low concentrations. These inks do not wet the felt very effectively (having C or D felt wetting metrics) and thus would not print effectively in standard ink jetting systems. Further, once applied to the paper, high static surface tension inks do not wet the paper well so the ink sits on the surface and can smear. Furthermore, if these inks are applied, their high static surface tension cause subsequent ink drops to repel causing poor image quality. Thus these inks give high optical density because the ink dries at the surface, but are impractical because of their high static surface tensions. Note that the high static surface tension (>50 mN/m) persist even up to 0.18 wt % of TERGITOL 15-s-12. All of our Inventive Inks show static surface tensions less than 50 mN/m even at 0.005 wt % addition.

To demonstrate the generality of our invention, we show optical density gains for a number of other structurally similar fluorosurfactant ink formulations. The ink formulations in Table 11 were prepared by combining 4.5 wt % Black Pearls 700 pigment (BP700), 12.00 wt % 1,3-propanediol, 3.00 wt % polyethylene glycol (400 mw, labeled PEG-400), and 0.20 wt % triethylamine (TEA), with the type and wt % of surfactant indicated, with the balance as water. These inks were drawn down on only two porous substrates, Georgia Pacific Premium Multi-Use Paper (P1) and Ipdataspeed Laser MOCR Paper (P4). The optical density gain metric was calculated between the inventive inks and the reference Comparative Ink #20 (which is made using the same formulation as Comparative Ink #4, but which was remade and drawn down on substrates P1 and P4).

concentration. In contrast, ZONYL FSE is structurally similar to ZONYL FSP, and similarly provides improved density at higher concentrations comparable to that of ZONYL FSP.

To demonstrate the general applicability of our invention further, we show examples of ink formulations using two magenta pigments (Ciba and Clarient) that are both polymer dispersed (employing 37/30/33 wt ratio copolymer of benzyl methacrylate/stearyl methacrylate/methacrylic acid neutralized with dimethylaminoethanol) and a self dispersing (Sensient Smart) magenta pigment in Table 12. Further ink formulation components indicated in Table 12, in addition to the named surfactants and humectants, include BME-77, which is a copolymer of benzylmethacrylate and methacrylic acid at monomer weight ratio of 77/23; BME-67, which is a copolymer of benzylmethacrylate and methacrylic acid at monomer weight ratio of 67/33; PU MOPE and PEPU 100, which are acid number 100 polyurethanes made with isophorone diisocyanate, 2,2-bis(hydroxymethyl)proprionic acid, and 2000 Mw Terathane polyol, with 95% of acid groups neutralized with potassium hydroxide; and MMNO, which is 4-methyl-morpholine-N-oxide.

TABLE 12

Magenta Ink Formulations: Inventive #24-26, Comparative #21-24.

| Sample ID | # | Surfynol 465 | Zonyl FSP | Tergitol 15-s-12 | PU100PE 2K-20K | PEPU 100 | BME-77 | BME-67 | 2-pyrrolidinone | glycerol | MMNO | 1,2-hexane diol |
|---|---|---|---|---|---|---|---|---|---|---|---|---|
| Inventive | 24 | | 0.01% | | | | 0.10% | 0.30% | | 5.00% | | |
| Comparative | 21 | | | 0.40% | | | 0.10% | 0.30% | | 5.00% | | |
| Inventive | 25 | | 0.02% | | | | | | | | | |
| Comparative | 22 | 0.50% | | | 1.02% | | | | 5.00% | 1.50% | 2.50% | 3.00% |
| Comparative | 23 | | 0.02% | | 1.20% | | | | 5.00% | 1.50% | 2.50% | 3.00% |
| Inventive | 26 | | 0.02% | | | 1.39% | | | | | | |
| Comparative | 24 | 0.50% | | | | 1.39% | | | 1.50% | 3.00% | | 4.00% |

| Sample ID | # | 1,3 propane diol | PEG 400 | TEG | Imidazo lidone | DEG | Ciba Magenta (19% | Clarient Magenta (20% | Sensient Smart Magenta | Kordek MLX | TEA (20%) |
|---|---|---|---|---|---|---|---|---|---|---|---|
| Inventive | 24 | | | | | 15.00% | | 4.50% | | 0.02% | 0.49% |
| Comparative | 21 | | | | | 15.00% | | 4.50% | | 0.02% | 0.49% |
| Inventive | 25 | 12.00% | 3.00% | | | | 3.90% | | | | 0.20% |
| Comparative | 22 | | | | | | 3.90% | | | 0.02% | |
| Comparative | 23 | | | | | | 3.90% | | | 0.02% | |
| Inventive | 26 | 12.00% | 3.00% | | | | | | 5.00% | | 0.20% |
| Comparative | 24 | | | 1.50% | 10.00% | | | | 5.00% | 0.21% | |

TABLE 11

Fluorosurfactant Inventive Inks #20-23, Comparative Inks #18-20. Formulations

| Sample ID | # | surfactant 1 (type) | amount (w/w) | Lowest ST humectant (type) | Drawdown Optical Density Gain Metric |
|---|---|---|---|---|---|
| Inventive | 20 | Zonyl FSA | 0.01% | 1,3 propanediol | HHH |
| Comparative | 18 | Zonyl FSA | 0.20% | 1,3 propanediol | ADH |
| Inventive | 21 | Zonyl FSE | 0.01% | 1,3 propanediol | HHH |
| Inventive | 22 | Zonyl FSE | 0.20% | 1,3 propanediol | HHH |
| Inventive | 23 | Zonyl FSH | 0.01% | 1,3 propanediol | HHH |
| Comparative | 19 | Zonyl FSH | 0.20% | 1,3 propanediol | CDS |
| Comparative | 20 | Terg 15-s-12 | 0.40% | 1,3 propanediol | DDD |

ZONYL FSA, FSE and FSH give dramatic optical density improvements like those seen for ZONYL FSP, ZONYL FSO and ZONYL FS-500. Like ZONYL FSO, the optical density gain for ZONYL FSA and ZONYL FSH falls off at 0.2%

These inks are formulated to have static surface tension less than 50 mN/m. The drawdown optical density data is recorded in Table 13 demonstrating that using ZONYL FSP at low concentrations yields improved density with both polymer dispersed and self dispersing magenta pigmented inks. The drawdown optical density gain metric for Inventive ink #24 is measured relative to Comparative Ink #21 (where the only difference is that 0.01 wt % ZONYL FSP fluorosurfactant is replaced with 0.40 wt % TERGITOL 15-s-12). Both of these formulations have DEG (diethylene glycol, 44.8 mN/m pure static tension) and Glycerol (64 mN/m pure static tension) as the humectants. These high surface tension humectants clearly do not interfere with the surface activity of the ZONYL FSP. The drawdown optical density gain metric for Inventive ink #25 and Comparative Ink #22 are measured relative to Comparative Ink #23 (where the key component is the surface active humectant, 3% 1,2 hexanediol used in Comparative Ink #22 and Comparative Ink #23, while 1,3 propanediol is used in Inventive ink #25). Clearly the optical density is dramatically improved when ZONYL FSP is used without 1,2 hexanediol present. Likewise Inventive ink #26 demonstrates an optical density improvement relative to Comparative Ink #24 when 0.02 wt % ZONYL FSP is added without 1,2 hexanediol. These examples illustrate that polymer dispersed and self dispersed magenta pigmented inks follow the same trends we have seen for carbon black pigmented formulations.

$DST_{20\ min}$ is less than each of $DST_{1\ sec}$ and $DST_{10\ sec}$, and the difference between $DST_{10\ sec}$ and $DST_{20\ min}$ is greater than 9.2 mN/m at 21° C. or the difference between $DST_{1\ sec}$ and $DST_{20\ min}$ is greater than 15.5 mN/m at 21° C., and wherein the static surface tension of the ink is less than 50 mN/m, further wherein the dynamic surface tension agent is an anionic fluorosurfactant comprising a phosphate group.

TABLE 13

Magenta Ink Results: Inventive #24-26 and Comparative #21-24.

| Sample ID | # | Pigment Color | % | Type | Dispersant | surfactant 1 (type) | amount (w/w) | Lowest ST humedant (type) | Drawdown Optical Density Gain Metric |
|---|---|---|---|---|---|---|---|---|---|
| Inventive | 24 | magenta | 4.50% | Sensient Smart | none (self dispersing) | Zonyl FSP | 0.01% | DEG | AAA |
| Comparative | 21 | magenta | 4.50% | Sensient Smart | none (self dispersing) | Tergitol 15-s-12 | 0.40% | DEG | DDD |
| Inventive | 25 | magenta | 3.90% | Ciba | 15% BmOcE 37/30/33 | Zonyl FSP | 0.02% | 1,3 propanediol | EEH |
| Comparative | 22 | magenta | 3.90% | Ciba | 15% BmOcE 37/30/33 | Surfynol 465 | 0.50% | 1,2 hexanediol | DDC |
| Comparative | 23 | magenta | 3.90% | Ciba | 15% BmOcE 37/30/33 | Zonyl FSP | 0.02% | 1,2 hexanediol | DDD |
| Inventive | 26 | magenta | 5.00% | Clarient | 20% BmOcE 37/30/33 | Zonyl FSP | 0.02% | 1,3 propanediol | ABA |
| Comparative | 24 | magenta | 5.00% | Clarient | 20% BmOcE 37/30/33 | Surfynol 465 | 0.50% | 1,2 hexanediol | DDD |

In summary, all of the fluorosurfactant containing inks disclosed in Inventive Inks #1-19 give measurable and significant gains in optical density, greater than 0.225 OD, on at least one of the three porous substrates used. Our seven preferred embodiments (inventive examples #6-8, #12-13, #16-17) each gave greater than 0.225 OD gain on at least one of the porous substrates and had acceptable felt wetting performance (not a marginal "C" or poor "D" felt wetting metric).

The addition of surface active humectants and traditional surfactants to fluorosurfactants was found to improve felt wetting and thus allows for the jetting of these inks in systems employing felt ink delivery systems. Unfortunately it eliminates the fluorosurfactant optical density benefits. Our long time DST metrics predict the optical density gain that is observed for inks with static surface tensions less than 50 mN/m. The correlation of the gain in optical density with the difference in dynamic surface tension at either 1 second or 10 seconds and 20 minutes is both novel and useful in selecting ink formulations for improved optical density. These DST metrics allow us to co-optimize the felt wetting performance with the optical density gain to find improved performance inks which can be jetted successfully on a drop-on-demand inkjet printer. The co-optimization of optical density with felt wetting, however, is not required for pressurized ink delivery systems that do not use felt, such as continuous ink jetting systems.

While the above inventive examples employ ZONYL fluorosurfactants, similar results are also expected with use of CAPSTONE fluorosurfactants provided by E. I. du Pont de Nemours and Company (Wilmington, Del.) as suggested replacements for use of ZONYL fluorosurfactants.

The invention has been described in detail with particular reference to certain preferred embodiments thereof, but it will be understood that variations and modifications can be effected within the spirit and scope of the invention.

The invention claimed is:

1. An inkjet ink comprising water, colorant, and a dynamic surface tension agent at an effective concentration such that the ink has a dynamic surface tension $DST_{1\ sec}$ at 1 second universal surface age, a dynamic surface tension $DST_{10\ sec}$ at 10 seconds universal surface age and a dynamic surface tension $DST_{20\ min}$ at 20 minutes universal surface age, where 2. The inkjet ink of claim 1 wherein the anionic fluorosurfactant comprising a phosphate group is present in a concentration up to about 1 wt %.

3. The inkjet ink of claim 1 wherein and the difference between $DST_{10\ sec}$ and $DST_{20\ min}$ is greater than about 9.2 mN/m.

4. The inkjet ink of claim 1 wherein and the difference between $DST_{10\ sec}$ and $DST_{20\ min}$ is greater than about 11 mN/m.

5. The inkjet ink of claim 1 wherein and the difference between $DST_{10\ sec}$ and $DST_{20\ min}$ is greater than about 14 mN/m.

6. The inkjet ink of claim 1 wherein the static surface tension is greater than about 15 mN/m and is less than about 45 mN/m.

7. The inkjet ink of claim 1 further comprising at least one non-fluorinated surfactant.

8. The inkjet ink of claim 1 wherein the anionic fluorosurfactant comprising a phosphate group contains a perhalogenated or perfluorinated alkyl terminal group.

9. The inkjet ink of claim 1 wherein the anionic fluorosurfactant comprising a phosphate group is present in a concentration of from 0.005 wt % to 1 wt %.

10. The inkjet ink of claim 1 wherein the anionic fluorosurfactant comprising a phosphate group is present in a concentration of from 0.01 wt % to 1 wt %.

11. The inkjet ink of claim 1 wherein the anionic fluorosurfactant comprising a phosphate group is present in a concentration of from 0.1 wt % to 1 wt %.

12. The inkjet ink of claim 1 wherein the anionic fluorosurfactant comprising a phosphate group is present in a concentration of from 0.005 wt % to less than 0.5 wt %.

13. The inkjet ink of claim 1 wherein the anionic fluorosurfactant comprising a phosphate group is present in a concentration of at least about 0.01 wt %.

14. The inkjet ink of claim 1 wherein the colorant is a pigment.

15. The inkjet ink of claim 14 wherein the pigment is a self-dispersed pigment.

16. The inkjet ink of claim 14 wherein the pigment is a polymer-dispersed pigment.

17. The inkjet ink of claim 1 further comprising at least one humectant.

18. The inkjet ink of claim 17 wherein the at least one humectant has a static surface tension of at least about 36 mN/m at 25° C.

19. The inkjet ink of claim 18 wherein the humectant is selected from the group consisting of 1,3-propanediol, 3-methyl-,1,3-butanediol, glycerol, ethylene glycol, diethylene glycol, polyethylene glycols, and 2-pyrrolidone.

20. The inkjet ink of claim 17 wherein any humectants having a static surface tension of less than 35 mN/m at 25° C. are present at a combined concentration of less than 1 wt %.

21. A method of printing on a substrate comprising using an inkjet print-head to deposit an inkjet ink of claim 1 on the substrate.

22. The method of claim 21 wherein the substrate is water absorbent.

23. The method of claim 22 wherein the substrate is plain or bond paper.

* * * * *